US012587118B2

(12) United States Patent
Schaeferle et al.

(10) Patent No.: US 12,587,118 B2
(45) Date of Patent: Mar. 24, 2026

(54) CORE SYNCHRONIZATION FOR LINEAR GENERATORS

(71) Applicant: Mainspring Energy, Inc., Menlo Park, CA (US)

(72) Inventors: Nick Schaeferle, Fremont, CA (US); Yuk Hei Wong, Santa Cruz, CA (US); Patrick Gorzelic, San Francisco, CA (US); Matthew Roelle, Belmont, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 0 days.

(21) Appl. No.: 18/938,165

(22) Filed: Nov. 5, 2024

(65) Prior Publication Data

US 2025/0175102 A1 May 29, 2025

Related U.S. Application Data

(63) Continuation of application No. 18/034,760, filed as application No. PCT/US2021/058056 on Nov. 4, 2021.

(Continued)

(51) Int. Cl.
*H02P 9/10* (2006.01)
*H02K 7/18* (2006.01)

(52) U.S. Cl.
CPC ............ *H02P 9/105* (2013.01); *H02K 7/1884* (2013.01)

(58) Field of Classification Search
CPC .. H02P 9/105; H02P 5/52; H02P 6/006; H02P 5/46; H02P 9/04; H02K 7/1884; H02K 33/12; F01B 11/003; F02B 63/041
See application file for complete search history.

(56) References Cited

U.S. PATENT DOCUMENTS 2,899,565 A * 8/1959 Turner ................. H02K 7/1884
290/1 R
3,297,007 A 1/1967 Monpetit
(Continued)

FOREIGN PATENT DOCUMENTS

DE 102008030633 A1 12/2009
GB 2413825 A * 11/2005 .............. F02B 71/02
(Continued)

OTHER PUBLICATIONS

Hanipah et al., "Recent commercial free-piston engine developments for automotive applications", Applied Thermal Engineering, vol. 75, Oct. 5, 2014, pp. 493-503.
(Continued)

*Primary Examiner* — Pedro J Cuevas
(74) *Attorney, Agent, or Firm* — HALEY GUILIANO LLP

(57) ABSTRACT

Systems and methods are provided for controlling two or more linear generators each operating according to a repeated behavior to constitute a cycle. A control system utilizes control circuitry to determine a desired phase offset between operation cycles of a first linear generator and a second linear generator of the two or more linear generators. During operation, an actual phase offset between the first linear generator and the second linear generator is determined. The control circuitry of the control system is used to modify the operation of at least one of the first linear generator or the second linear generator to achieve the desired phase effect.

20 Claims, 12 Drawing Sheets

Related U.S. Application Data

(60) Provisional application No. 63/109,973, filed on Nov. 5, 2020.

(56)  References Cited

U.S. PATENT DOCUMENTS

| | | | | |
|---|---|---|---|---|
| 3,552,120 | A * | 1/1971 | Beale | F02G 1/0435 |
| | | | | 60/525 |
| 4,154,200 | A | 5/1979 | Jarret et al. | |
| RE30,176 | E * | 12/1979 | Beale | F02G 1/0435 |
| | | | | 60/520 |
| 4,791,786 | A | 12/1988 | Stuyvenberg | |
| 4,924,956 | A * | 5/1990 | Deng | F02B 75/04 |
| | | | | 180/65.245 |
| 5,775,273 | A * | 7/1998 | Beale | F02B 71/04 |
| | | | | 123/46 B |
| 6,170,443 | B1 | 1/2001 | Hofbauer | |
| 6,181,110 | B1 | 1/2001 | Lampis | |
| 6,293,231 | B1 | 9/2001 | Valentin | |
| 6,652,247 | B2 | 11/2003 | Gray, Jr. | |
| 6,694,858 | B2 * | 2/2004 | Grimes | F04B 47/04 |
| | | | | 91/317 |
| 6,823,671 | B2 * | 11/2004 | Achten | F02B 71/045 |
| | | | | 60/419 |
| 6,948,459 | B1 * | 9/2005 | Laumen | F02B 71/04 |
| | | | | 123/46 R |
| 6,971,339 | B2 | 12/2005 | Janssen | |
| 7,721,686 | B2 | 5/2010 | Lindgarde | |
| 8,127,544 | B2 | 3/2012 | Schwiesow et al. | |
| 8,413,617 | B2 | 4/2013 | Simpson et al. | |
| 8,522,538 | B2 * | 9/2013 | Ingersoll | F03D 9/257 |
| | | | | 417/267 |
| 8,997,699 | B2 * | 4/2015 | Roelle | F02B 71/04 |
| | | | | 123/197.1 |
| 9,470,110 | B2 * | 10/2016 | Stroganov | F03G 6/066 |
| 9,567,898 | B2 * | 2/2017 | Simpson | F02B 75/282 |
| 9,657,675 | B1 | 5/2017 | Roelle et al. | |
| 9,869,274 | B2 * | 1/2018 | Fuhrman | F01K 27/005 |
| 9,885,280 | B2 * | 2/2018 | Hamann | F02B 63/042 |
| 10,024,231 | B2 * | 7/2018 | Simpson | F02B 71/00 |
| 10,156,198 | B2 * | 12/2018 | Roelle | F01B 11/00 |
| 10,202,897 | B2 | 2/2019 | Sun et al. | |
| 10,221,759 | B2 * | 3/2019 | Simpson | F01B 11/001 |
| 10,404,199 | B2 * | 9/2019 | Da Costa | H02P 6/005 |
| 10,408,150 | B2 * | 9/2019 | Roelle | F02D 35/023 |
| 10,472,995 | B2 * | 11/2019 | Gusev | F01B 25/00 |
| 10,715,068 | B2 * | 7/2020 | Da Costa | H02P 6/005 |
| 10,731,586 | B2 * | 8/2020 | Roelle | F02D 35/024 |
| 10,851,708 | B2 * | 12/2020 | Simpson | H02K 7/1892 |
| 10,985,641 | B2 | 4/2021 | Lawler et al. | |
| 11,053,876 | B2 * | 7/2021 | Roelle | F02D 41/009 |
| 11,211,885 | B2 * | 12/2021 | Da Costa | F02B 71/04 |
| 11,339,735 | B2 * | 5/2022 | Roelle | F02D 29/06 |
| 11,404,937 | B2 * | 8/2022 | Svrcek | H02K 7/1884 |
| 11,421,586 | B2 * | 8/2022 | Liu | F02B 41/06 |
| 11,525,391 | B2 * | 12/2022 | Simpson | F02B 25/08 |
| 11,616,428 | B2 * | 3/2023 | Lawler | F02B 71/04 |
| | | | | 310/17 |
| 11,652,432 | B2 * | 5/2023 | Da Costa | F02B 71/04 |
| | | | | 322/3 |
| 11,831,225 | B2 * | 11/2023 | Liu | H02K 7/1166 |
| 11,982,186 | B1 * | 5/2024 | Freeman | H02K 35/02 |
| 12,113,427 | B2 * | 10/2024 | Manasra | F02B 75/28 |
| 12,170,501 | B2 * | 12/2024 | Schaeferle | H02P 5/52 |
| 12,283,911 | B2 * | 4/2025 | Da Costa | H02P 25/06 |
| 2003/0121405 | A1 * | 7/2003 | Grimes | F04B 47/04 |
| | | | | 91/247 |
| 2005/0081804 | A1 | 4/2005 | Graf et al. | |
| 2006/0124083 | A1 | 6/2006 | Niiyama et al. | |
| 2007/0007917 | A1 | 1/2007 | Yagi | |
| 2008/0196680 | A1 | 8/2008 | Janak et al. | |
| 2009/0179424 | A1 | 7/2009 | Yaron | |
| 2010/0275884 | A1 | 11/2010 | Gray, Jr. | |
| 2011/0100002 | A1 * | 5/2011 | Muir | F03G 4/074 |
| | | | | 60/641.2 |
| 2011/0221206 | A1 * | 9/2011 | Milinkovic | F01K 13/00 |
| | | | | 60/660 |
| 2012/0024264 | A1 | 2/2012 | Mikalsen et al. | |
| 2012/0112467 | A1 | 5/2012 | Gopalakrishnan et al. | |
| 2012/0126544 | A1 * | 5/2012 | Simpson | F02B 63/04 |
| | | | | 290/1 A |
| 2012/0204836 | A1 * | 8/2012 | Roelle | F02B 75/285 |
| | | | | 123/46 R |
| 2013/0082000 | A1 | 4/2013 | d'Artenay et al. | |
| 2014/0238011 | A1 * | 8/2014 | Fuhrman | C02F 1/04 |
| | | | | 60/508 |
| 2014/0373527 | A1 * | 12/2014 | Stroganov | F04B 9/123 |
| | | | | 60/645 |
| 2016/0160754 | A1 | 6/2016 | Moriya et al. | |
| 2016/0208686 | A1 | 7/2016 | Gadda et al. | |
| 2017/0350339 | A1 * | 12/2017 | Roelle | F02D 29/06 |
| 2018/0179918 | A1 * | 6/2018 | Gusev | F01K 23/10 |
| 2019/0063357 | A1 * | 2/2019 | Roelle | F02D 35/024 |
| 2019/0123668 | A1 | 4/2019 | Da Costa et al. | |
| 2019/0149074 | A1 * | 5/2019 | Da Costa | H02P 3/18 |
| | | | | 322/3 |
| 2019/0390623 | A1 * | 12/2019 | Roelle | F02D 41/1402 |
| 2020/0036273 | A1 | 1/2020 | Lawler et al. | |
| 2020/0195093 | A1 * | 6/2020 | Svrcek | F01B 11/003 |
| 2020/0328707 | A1 * | 10/2020 | Da Costa | F02B 71/04 |
| 2021/0010437 | A1 * | 1/2021 | Roelle | F02D 41/1497 |
| 2021/0288570 | A1 * | 9/2021 | Lawler | H02K 7/08 |
| 2021/0324812 | A1 * | 10/2021 | Roelle | F02D 41/009 |
| 2022/0120214 | A1 * | 4/2022 | Liu | F02B 41/06 |
| 2022/0123626 | A1 * | 4/2022 | Liu | H02K 7/1892 |
| 2022/0173682 | A1 * | 6/2022 | Da Costa | H02P 25/06 |
| 2022/0381192 | A1 * | 12/2022 | Roelle | F02B 71/04 |
| 2022/0399784 | A1 * | 12/2022 | Svrcek | F02B 71/04 |
| 2023/0198367 | A1 * | 6/2023 | Lawler | H02K 41/031 |
| | | | | 310/17 |
| 2023/0246576 | A1 * | 8/2023 | Da Costa | H02P 9/006 |
| | | | | 322/3 |
| 2024/0113644 | A1 * | 4/2024 | Schaeferle | H02P 9/105 |
| 2024/0125281 | A1 * | 4/2024 | Roelle | F02B 71/00 |
| 2024/0146152 | A1 * | 5/2024 | Manasra | H02K 7/1876 |
| 2024/0297553 | A1 * | 9/2024 | Svrcek | H02K 1/12 |

FOREIGN PATENT DOCUMENTS

| | | | | | |
|---|---|---|---|---|---|
| GB | | 2469279 | A * | 10/2010 | F02G 1/02 |
| JP | | 2006-170071 | A | 6/2006 | |
| JP | | 2012-021461 | A | 2/2012 | |
| JP | | 2012-031746 | A | 2/2012 | |
| JP | | 2012-202386 | A | 10/2012 | |
| JP | | 2012-202387 | A | 10/2012 | |
| JP | | 2015-074308 | A | 4/2015 | |
| WO | | WO-0123721 | A1 * | 4/2001 | F02B 63/06 |
| WO | | 2005/100764 | A1 | 10/2005 | |
| WO | | WO-2009091834 | A1 * | 7/2009 | B60K 6/26 |
| WO | | 2014/172382 | A1 | 10/2014 | |
| WO | | 2017/171816 | A1 | 10/2017 | |

OTHER PUBLICATIONS

Johansen et al., "Free-Piston Diesel Engine Timing and Control- Towards Electronic Cam- and Crankshaft", IEEE Transactions on Control Systems Technology, vol. 9, No. 3, Mar. 1, 2002, pp. 1-14.

Zaseck et al., "Adaptive control approach for cylinder balancing in a hydraulic linear engine", 2013 American Control Conference, Jun. 17, 2013, pp. 2171-2176.

* cited by examiner

300

800

900

1200

1300

CORE SYNCHRONIZATION FOR LINEAR GENERATORS

CROSS-REFERENCE TO RELATED APPLICATIONS

This application is a continuation of U.S. application Ser. No. 18/034,760 (now allowed), filed May 1, 2023, which is a national stage application under 35 U.S.C. § 371 of International Application PCT/US2021/058056, filed Nov. 4, 2021, which claims the benefit of U.S. Provisional Patent Application No. 63/109,973, filed Nov. 5, 2020, the disclosures of which are hereby incorporated by reference herein in their entireties.

The present disclosure is directed to controlling the operation of linear generators, and more particularly, to phase lock control of two linear generators operating on reaction cycles ("core synchronization").

SUMMARY

The present disclosure is directed to controlling the operation of linear generators (i.e., two or more linear generators). In some embodiments, control circuitry is used to determine a desired phase offset between operation of a first linear generator and a second linear generator. An actual phase offset between the first linear generator and the second linear generator is determined during operation. The control circuitry is used to modify operation of at least one of the first linear generator or the second linear generator to achieve the desired phase offset.

In some embodiments, determining the actual phase offset comprises measuring or estimating a difference in operation of the first linear generator and the second linear generator.

In some embodiments, the desired phase offset is based on at least one of a difference in an apex time between the first linear generator and the second linear generator, difference in an apex position between the first linear generator and the second linear generator, a difference in a position-time trajectory between the first linear generator and the second linear generator, a difference in an electrical output between the first linear generator and the second linear generator, and/or a difference in an estimated or measured pressure feature between the first linear generator and the second linear generator.

In some embodiments, the desired phase offset comprises one of a difference in times of achieving BDC positions, a difference in times of achieving TDC positions, a difference in times of achieving specified positions, and/or a difference in times of achieving velocities.

In some embodiments, modifying operation comprises at least one of modifying apex positions of one or both linear generators, modifying times of apex positions of one or both linear generators, identifying a leading and a following linear generator of the first and second linear generators, modifying a power output of one or both linear generators, modifying an electromagnetic force generated by one or both linear generators, and/or modifying a frequency of one or both linear generators.

In some embodiments, controlling the operation of linear generators further comprises matching a natural frequency of the first linear generator and the second linear generator.

In some embodiments, the system that controls the operation of linear generators comprises a first core comprising at least one first translator, a second core comprising at least one second translator, a power electronics system for controlling current flow in the first core and the second core, and a control system. In some embodiments, the control system is configured to determine a desired phase offset between operation of a first linear generator and a second linear generator, determine during operation an actual phase offset between the first linear generator and the second linear generator, and modify operation of at least one of the first linear generator or the second linear generator to achieve the desired phase offset.

In some embodiments, the first core comprises at least one first stator, wherein the second core comprises at least one second stator, and wherein the power electronics system is coupled to the first stator and to the second stator.

In some embodiments, the at least one first translator comprises a first pair of opposed translators. In some embodiments, the first core comprises a pair of first stators corresponding to the first pair of opposed translators. In some embodiments, the at least one second translator comprises a second pair of opposed translators and the second core comprises a pair of second stators corresponding to the second pair of opposed translators.

In some embodiments, the at least one first translator translates between a first apex and a second apex at a first frequency. In some embodiments, the at least one second translator translates between a third apex and a fourth apex at a second frequency. In some embodiments, the actual phase offset is based on one of the first apex and the third apex, the second apex and the fourth apex, and/or the first frequency and the second frequency.

In some embodiments, the control system determines the actual phase offset by measuring or estimating a difference in operation of the first linear generator and the second linear generator.

In some embodiments, the control system matches a natural frequency of the first linear generator and the second linear generator.

In some embodiments, the present disclosure is directed to a non-transitory computer-readable medium having instructions encoded thereon that, when executed by control circuitry, cause the control circuitry to determine a desired phase offset between operation of a first linear generator and a second linear generator. The instructions further cause the control circuitry to determine, during operation, an actual phase offset between the first linear generator and the second linear generator. Operation of at least one of the first linear generator or the second linear generator may be modified to achieve the desired phase offset.

In some embodiments, the instructions for modifying operation comprises instructions for at least one of modifying apex positions of one or both linear generators, modifying times of apex positions of one or both linear generators, identifying a leading and a following linear generator of the first and second linear generators, modifying a power output of one or both linear generators, modifying an electromagnetic force generated by one or both linear generators, and/or modifying a frequency of one or both linear generators.

In some embodiments, the non-transitory computer-readable medium comprises instructions encoded thereon that, when executed by control circuitry, cause the control circuitry to match a natural frequency of the first linear generator and the second linear generator.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

DETAILED DESCRIPTION

Figure 1:
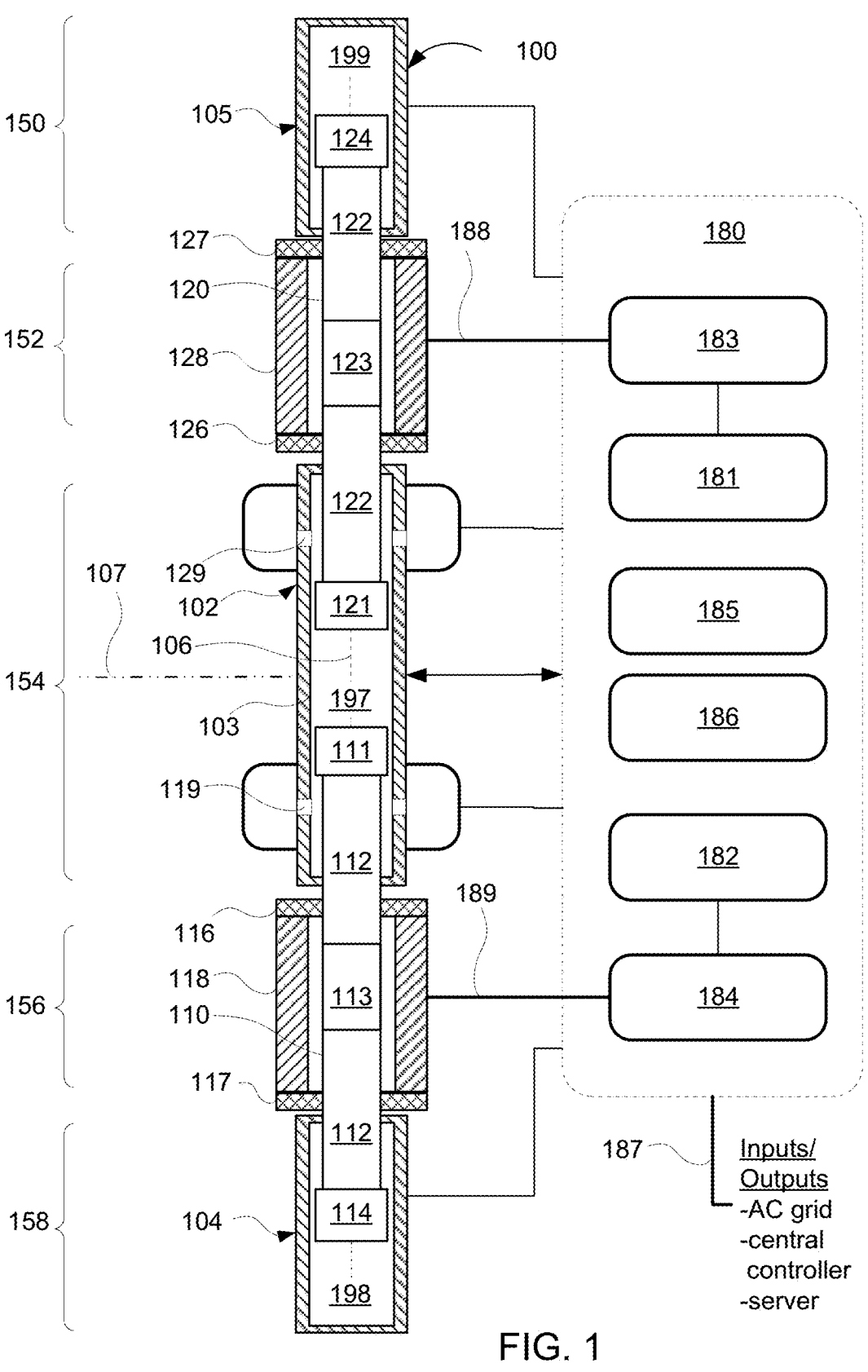
FIG. 1 shows a block diagram of an illustrative control system and a cross-sectional view of an illustrative generator assembly, in accordance with some embodiments of the present disclosure.

Operating two linear generator (or "generator") cores at the same time may cause undesirable electrical and acoustic effects because the generator's output and acoustic profile are cyclic and not constant with cycle phase. Linear generators include one or more linear electromagnetic machines ("LEMs") that each include a stator that produces electromotive force that acts on a respective translator when the translator is in motion. For example, a linear generator may include two LEMs in an opposed-translator configuration. Each LEM may comprise a linear generator. During operation, each translator is momentarily stationary at each end of a stroke (e.g., at top dead center ("TDC") and bottom dead center ("BDC") or other apex of the stroke). Thus, the electrical power generated by the linear generator (e.g., from each LEM) pulsates at about twice the generator cycle frequency. While the mitigation of acoustic noise benefits from approximately 180 degrees of phase difference, the voltage swing on a common DC bus would be lower if operated at around 90 degrees of phase difference. The 90 degrees of phase difference may reduce capacitance requirements. Therefore, in some embodiments, it may be desirable to split the DC bus between generators to avoid constructive interference on voltage when one generator core is starting or stopping and cannot be synchronized with the other.

Another rationale for synchronizing cores is acoustic output (e.g., noise). A linear generator may produce higher levels of noise during a portion of a cycle corresponding to an exhaust process (e.g., a blowdown event) than during an intake portion of the cycle (e.g., air and fuel provided to intake ports during scavenging). Two generators can interact to produce constructive and destructive interference in noise emissions (i.e., exhibited by beating or otherwise compound pulses). Beating of two generator cores can, in some circumstances, produce higher acoustic noise peaks and an undesirable low-frequency amplitude cycle.

The systems and methods for core synchronization ("core-sync") help mitigate the aforementioned problems by synchronizing the frequency and phasing of two generator cores. Accordingly, exhaust pressure pulsations may be phased, for example, 180 degrees apart so that the pressure waves (e.g., sound) are minimally constructive or otherwise less constructive.

Another potential benefit of synchronizing generator cores includes the ability to control core-to-core breathing variability. The exhaust back-pressure may couple the two systems depending on how far downstream the exhaust systems of the cores connect. This effect may be especially pronounced when the cores share any common constrained flow path such as in a muffler, exhaust after-treatment equipment (e.g., oxidation catalyst, selective catalytic reduction, catalytic converter), a heat exchanger, or a common coupling point of exit.

Synchronizing generator cores may also balance the peak flowrate through exhaust after-treatment equipment. Exhaust after-treatment equipment or devices (e.g., solid-state catalytic converts, oxidation catalysts, three-way catalysts, or selective reduction catalysts (SCRs)) are typically limited in efficacy by peak and average flow. The peak flowrate is better when two cores are out-of-phase and exhausting through one large after-treatment device rather than two cores exhausting through their own smaller after-treatment devices. Thus, running the cores out of phase may enable the use of a single after-treatment device shared by both cores.

In embodiments where several linear generator cores/cylinders share a common frame, it may be beneficial to avoid all the cores having high air spring (AS) pressure at the same time. AS pressure stretches the frame. Multiple core AS pressures peaking simultaneously could put more stress on the common frame than if the pressures were out of phase. For example, if there were four cores to a frame, the frame could be lighter if the AS peak pressures were 900 out of phase from each other. In some embodiments, cores mounted to a common frame that are out of synchronization could torque the frame (e.g., which may cause adverse twisting or other deformation, stresses, or both). If fuel pressure is extremely low, the line could be sensitive to the intake plenum pressure it is feeding. Thus, to achieve predictable fuel flow, the intake pressure fluctuations can be synchronized by adjusting the phasing between the cores. Each of these issues may have their effects at least mitigated or possibly eliminated by synchronizing the described generator cores.

Control System

FIG. 1 shows a block diagram of illustrative control system 180 and a cross-sectional view of an illustrative generator assembly 100, in accordance with some embodiments of the present disclosure. Generator assembly 100 is configured as an opposed, free-piston linear generator. As illustrated, generator assembly 100 includes driver sections 150 and 158, linear electromagnetic machines 152 and 156, and power cylinder assembly 154.

Generator assembly 100 includes translators 110 and 120, which are configured to move along axis 106 (e.g., translate linearly along axis 106). Translators 110 and 120 are configured to move within cylinders 102, 104 and 105, thus forming expansion and compression volumes 197, 198, and 199 for performing boundary work (e.g., determined using the integral ∫ PdV over a suitable range such as a stroke or cycle). For clarity, the spatial arrangement of the systems and assemblies described herein will generally be referred to in the context of cylindrical coordinates, having axial, radial, and azimuthal directions. It will be understood that any suitable coordinate system may be used (e.g., cylindrical coordinates may be mapped to any suitable coordinate system), in accordance with the present disclosure. Note that axis 106 is directed in the axial direction, and the radial direction is defined as being perpendicular to axis 106 (e.g., directed away from axis 106). The azimuthal direction is defined as the angular direction around axis 106 (e.g., orthogonal to both axis 106 and the radial direction, and directed around axis 106).

In some embodiments, the stationary components of generator assembly 100 include cylinder 102, cylinder 104, cylinder 105, stator 118, stator 128, bearing housing 116, bearing housing 117, bearing housing 126, and bearing housing 127. In some embodiments, bearing housings 116 and 117 are coupled to stator 118 (e.g., either directly connected, or coupled by an intermediate component such as a flexure, mount, or both). For example, bearing housings 116 and 117 may be aligned to (e.g., laterally or axially aligned), and affixed to, stator 118 to maintain a radial air gap between magnet assembly 113 and stator 118. Similarly, in some embodiments, bearing housings 126 and 127 are rigidly coupled to stator 128. In a further example, in some embodiments, bearing housing 126 and 127 are aligned to either stator 118 or stator 128, but affixed to another portion of a generator assembly or components thereof.

Translator 110 includes tube 112, piston 111, piston 114, and magnet assembly 113, all substantially rigidly coupled to move as a substantially rigid body along axis 106, relative to the stationary components. Translator 120 includes tube 122, piston 121, piston 124, and magnet assembly 123, all substantially rigidly coupled to move as a substantially rigid body along axis 106. In some embodiments, magnet assemblies 113 and 123 may be a region of tubes 112 and 122, respectively. In some embodiments, magnet assemblies 113 and 123 may include separate components affixed to tubes 112 and 122, respectively. Reaction section 197 is bounded by pistons 111 and 121, as well as bore 103 of cylinder 102. Gas springs 198 and 199 are bounded by respective pistons 114 and 124, as well as respective cylinders 104 and 105.

Accordingly, as translators 110 and 120 move along axis 106, the volumes of reaction section 197, gas spring 198, and gas spring 199 expand and contract. Further, for example, pressures within those volumes decrease or increase as the volume increases or decreases, respectively. Each of bearing housings 116, 117, 126, and 127 is configured to provide a gas bearing between itself and the corresponding translator (e.g., tube 112 and 122). For example, each of bearing housings 116, 117, 126, and 127 may be configured to direct pressurized gas to the gas bearing (e.g., via a flow system). In an illustrative example, each of bearing housings 116, 117, 126, and 127 may be configured to direct pressurized gas having an absolute pressure greater than ambient pressure (e.g., 1 atm at sea level) to the gas bearing such that bearing gas has sufficient pressure to flow through the gas bearing and into the environment (e.g., directly or via other ducting). In some embodiments, bearing gas may be pressurized relative to the environment (e.g., about 1 atm), a pressure in a breathing system (e.g., a boost pressure, or a gas pressure in an exhaust system that may be greater than or less than 1 atm), or any other suitable pressure reference. In some embodiments, generator assembly 100 is configured for oil-less operation (e.g., without the use of lubricating liquids or without the use of solid-to-solid contact bearings), with bearing housings 116, 117, 126, and 127 forming gas bearings against translators 110 and 120. Cylinder 102 includes bore 103, which houses compression section 197. Cylinder 102 also includes illustrative ports 119 and ports 129, which couple bore 103 to the outside of cylinder 102 to allow fluid exchange.

Stator 118, magnet assembly 113, tube 112, and bearing housings 116 and 117 form LEM 156. Similarly, stator 128, magnet assembly 123, tube 122, and bearing housings 126 and 127 form LEM 152. Further, a LEM may optionally include one or more pistons affixed to the translator. For example, a LEM may be defined to include stator 118, translator 110, and bearing housings 116 and 117. In a further example, a LEM may be defined to include stator 128, translator 120, and bearing housings 126 and 127. A LEM includes a stationary assembly (e.g., a stator and bearing housings) and a translating assembly (e.g., a translator) that is constrained to move along an axis, wherein the stator is capable of applying an electromagnetic force on the translator to cause and/or effect motion along the axis. The bearing housing of a LEM may be, but need not be, affixed to the stator. For example, the bearing housings may be coupled to the stator, a structural frame, a cylinder, either directly or by one or more intervening components, or any combination thereof. Stators 118 and 128 may include a plurality of phase windings, which form a plurality of phases. The current in each of the phases may be controlled by a control system (e.g., which may include corresponding power electronics and processing equipment) to affect the position of translators 110 and 120, motion of translators 110 and 120, enable interactions with translators 110 and 120, or any combination thereof. In some embodiments, magnet assemblies 113 and 123 include permanent magnets arranged in an array (e.g., of alternating North and South poles). Because translators 110 and 120 move as substantially rigid assemblies, electromagnetic forces applied to respective magnet assemblies 113 and 123 accelerate and decelerate translators 110 and 120. In some embodiments, stators 118 and 128 may be air-cooled (e.g., by an air-cooling system), liquid-cooled (e.g., by a liquid cooling system), or both. In some embodiments, stators 118 and 128 are arranged around respective translators 110 and 120, or respective magnet assemblies 113 and 123 thereof (e.g., the motor air gap is arcuate with a thickness profile). For example, stators 118 and 128 may extend fully around (e.g., 360 degrees azimuthally around) or partially around (e.g., having azimuthally arranged segments and azimuthally arranged gaps between windings of a phase) respective translators 110 and 120. In some embodiments, stators 118 and 128 are arranged axially along respective translators 110 and 120, or respective magnet assemblies 113 and 123 thereof. For example, magnet assemblies 113 and 123 may include flat magnet sections and stators 118 and 128 may include flat surfaces that correspond to the magnet sections (e.g., the motor air gap is planar with a thickness profile). In some embodiments, stators 118 and 128 extend axially along respective translators 110 and 120, or respective magnet assemblies 113 and 123 thereof.

As illustrated, control system 180 includes phase controllers 181 and 182 (in the hardware sense, "phase" refers to a plurality of windings on a stator that may be grouped into a plurality of phases and each phase of the plurality of phases includes one or more windings of the plurality of windings), power electronics 183 and 184, auxiliary controller 185, and sensor system 186. In some embodiments, each phase controller 181 and 182 is configured to control application of current to one or more phases of a multiphase stator (e.g., phases of respective stators 118 and 128). Further, each of phase controllers 181 and 182 may include elements of an overall electrical system distributed to each phase control system. In an illustrative example, phase controllers 181 and 182 may be included along with other phase controllers (e.g., other similar controllers) to control each of a plurality of phases of a stator (e.g., stators 118 and 128). In some embodiments, control system 180 controls more than one generator assembly. In some embodiments, control system 180 controls a single generator assembly, and multiple control systems may be used to control multiple generator assemblies and may communicate with each other and/or with a central controller.

In some embodiments, phase controllers 181 and 182 are configured to control current in one or more phases of respective stators 118 and 128 via respective power electronics 183 and 184. In some embodiments, a desired or commanded current to be applied to each corresponding phase is calculated locally by phase controllers 181 and 182. In some embodiments, a desired or commanded current to be applied to the one or more phases is communicated from a central controller (not illustrated in FIG. 1 but shown as control system 250 in FIG. 2), which determines currents to be applied on each of the phases (e.g., of stators 118 and 128, and optionally other phases of other stators not shown). For example, the desired or commanded current to be applied to the one or more phases may be determined to achieve a measured magnet or translator position, to achieve a total LEM force (e.g., summed from the electromagnetic force applied by each phase), to a achieve a translator velocity or acceleration, to achieve a desired translator position (e.g., an apex position), or any combination thereof.

In some embodiments, phase controllers 181 and 182 are configured to sense magnetic flux in the corresponding phase. For example, phase controllers 181 and 182 may sense the phase's magnetic flux and use the sensed flux as control feedback. In some such embodiments, phase controllers 181 and 182 need not include a current sensor or be configured to receive input from a current sensor. In some such embodiments, each of phase controllers 181 and 182 include one or more current sensors (e.g., one per phase, DC bus, or both). Sensor system 186 may include position sensors (e.g., linear encoders) for measuring a relative position between translators 110 and 120 and respective stators 118 and 128, current sensors for measuring phase currents of stators 118 and 128, voltage sensors for measuring voltages associated with stators 118 and 128, temperature sensors for measuring fluid temperatures and/or component temperatures, accelerometers for measuring vibration, strain sensors for measuring displacement, any other suitable sensors, or any combination thereof that may be installed in generator assembly 100, control system 180, or both.

In some embodiments, the current applied to or voltage applied across each phase is controlled locally (i.e., by an instance of phase controllers 181 or 182) to any suitable degree. In some embodiments, phase controllers 181 and 182 may execute a local control loop on phase current. For example, a current command may be communicated over a communication link from a central controller to each of phase controllers 181 and 182. Any suitable part of the control mechanism may also be distributed in accordance with the present disclosure. For example, a position measurement may be distributed to every phase, and each of phase controllers 181 and 182 may determine desired position and force to determine a current command, which may be applied by respective power electronics 183 and 184.

In some embodiments, each of phase controllers 181 and 182 are configured to provide a control signal to respective power electronics 183 and 184. Power electronics 183 and 184 are configured to electrically couple to phase leads of each phase of respective stators 118 and 128 and provide the current to the phases. Accordingly, power electronics 183 and 184 include components configured for amperages and voltages relevant to the DC bus and phase leads. Phase controllers 181 and 182 need not be configured to electrically manage or interact with such large currents or voltages as required by the phase leads and power electronics 183 and 184. In some embodiments, phase controllers 181 and 182 and power electronics 183 and 184 may be combined or integrated into a single module, or two respective modules, configured to control and apply current to each phase of stators 118 and 128. In some embodiments, power electronics 183 and 184 may be shared among more than one phase. For example, power electronics 183 and 184 may include multiple power circuits, be configured to receive multiple control signals, and be configured to apply current to more than one phase.

In some embodiments, each of phase controllers 181 and 182 may be configured to estimate position of the translator relative to the stator (e.g., based on instructions stored in non-transitory computer readable media), rather than a central algorithm estimating or measuring position. Accordingly, the central algorithm may be distributed among several phase controllers. In some embodiments, each position estimator for multiple phase controllers may be part of a distributed position estimator. The distributed position estimator may estimate position based on, for example, the sensing of phase voltage in each corresponding phase. In some such embodiments, a dedicated position sensor need not be included, thus saving the cost and reliability concerns of the position sensor.

In some embodiments, phase controllers 181 and 182, and/or auxiliary controller 185, may be configured to manage power for processing functions of phase controllers 181 and 182, perform diagnostics (e.g., for power electronics 183 and 184), any other suitable process requiring power, or any suitable combination thereof. In some embodiments, suitable components of control system 180 may be coupled to a grid (e.g., a utility grid having three-phase power). For example, power electronics 183 and 184 may be coupled to a grid via a grid-tie inverter separate from, or included as part of, control system 180.

In some embodiments, suitable components of control system 180 may be coupled to one or more phases of a LEM (e.g., LEMs 152 and 156) via phase leads 188 and 189. For example, power electronics 183 and 184 may be coupled to respective phase leads 188 and 189. In some embodiments, phase leads 188 and 189 may include two phase leads per phase (e.g., 2*N phase leads for N phases, or a full-bridge topology). In some embodiments, phase leads 188 and 189 may include one phase lead per phase (e.g., N phase leads of N wye-connected phases, or a half-bridge topology). In some embodiments, phase leads 188 and 189 may be wired in a star configuration. For example, for a wye-type configuration, one phase lead from each phase may be coupled together to form a neutral phase voltage (e.g., having net zero current input or output, so phase currents must sum to zero), while each phase control system applies a controlled phase voltage, and thus current, to the other lead of the corresponding phase. In some such embodiments, only some of the DC bus voltage (e.g., the difference between a bus and the neutral voltage) may be available to apply across each phase of stators 118 and 128. In some embodiments, phase leads for each phase may be wired in an independent configuration. For example, control system 180 may include a full H-bridge per phase and may be able to apply the full DC bus voltage across the phase in either direction (e.g., to cause a desired current to flow in either direction). This configuration provides a larger voltage range available to each phase as well as control independence from the other phases. For example, without a common neutral wye connection, the phase currents need not sum to zero. In some embodiments, control system 180 may be configured to extract power from phases of LEMs 152 and 156 (e.g., windings of stators 118 and 128 thereof). For example, in the event of a detected system failure or loss of communication, phase controllers 181 and 182 may attempt to extract energy from the kinetic energy of a translator by commanding current in the opposite direction of a back electromotive force ("emf") in the corresponding phase.

In some embodiments, suitable components of control system 180 may be coupled to a communications (COMM) link, illustrated as part of inputs/outputs (I/O) 187. For example, phase controllers 181 and 182, power electronics 183 and 184, auxiliary controller 185, sensor system 186, or a combination thereof may be coupled to I/O 187 (e.g., a COMM link thereof). In some embodiments, a COMM link may include a wired communications link such as, for example, an ethernet cable, a serial cable, any other suitable wired link, or any combination thereof. In some embodiments, a COMM link may include a wireless communications link such as, for example, a Wi-Fi transmitter/receiver, a Bluetooth transmitter/receiver, any other suitable wireless link, or any combination thereof. As illustrated, I/O 187 may include any suitable communication link enabling transmission of data, messages, signals, information, or a combination thereof. In some embodiments, control system 180 is coupled to a central controller system via I/O 187. For example, in some embodiments, phase controllers 181 and 182 communicate with a central controller via a COMM link of I/O 187.

Figure 2:
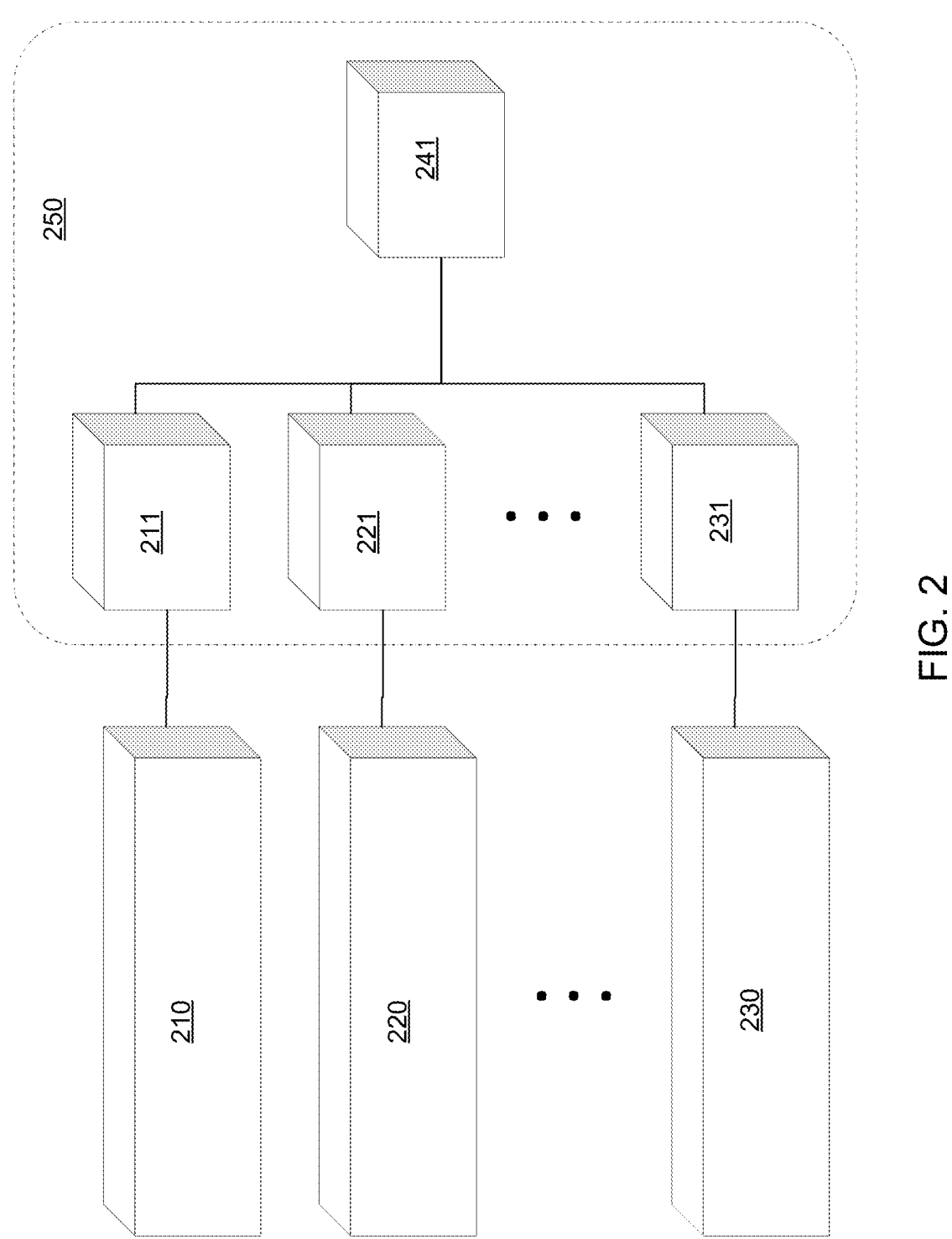
FIG. 2 shows a block diagram of an illustrative system having multiple cores, in accordance with some embodiments of the present disclosure.

FIG. 2 shows a block diagram of illustrative system 200 having multiple cores (e.g., including 210, 220, and 230), in accordance with some embodiments of the present disclosure. As illustrated, system 200 includes cores 210, 220, and 230, controllers 211, 221, and 231, and control system 250.

The ellipsis included in FIG. 2 indicate that any suitable number of cores may be included, along with corresponding controllers that communicate with control system 250. It will be understood that a system may include one core, two cores, or more than two cores, in accordance with the present disclosure. In some embodiments, control may be distributed amongst controllers 211, 221, and 231 without the need of controller 241 or encompassing control system 250.

Each of cores 210, 220, and 230 may include a respective generator assembly such as, for example, generator assembly 100 of FIG. 1. Each of controllers 211, 221, and 231 may, for example, be comprised of phase controllers 181 and 182 of FIG. 1 and/or auxiliary controller 185 of FIG. 1. In some embodiments, each of controllers 211, 221, and 231 may comprise power electronics 183 and 184 of FIG. 1. Cores 210, 220, and 230 are each communicably coupled to each of controllers 211, 221, and 231, respectively. Controllers 211, 221, and 231 are communicably coupled to controller system 241 which may, for example, include any or all of the components of control system 180 of FIG. 1. Instructions for controlling each of cores 210, 220, and 230 may be stored in any or all of controllers 211, 221, and 231. In some embodiments, controller 241 comprises instructions for operating controls 211, 221, and 231 in order to synchronize each of cores 210, 220, and 230. In some embodiments, control system 250 is eliminated with coordination roles distributed amongst core controllers.

Figure 3:
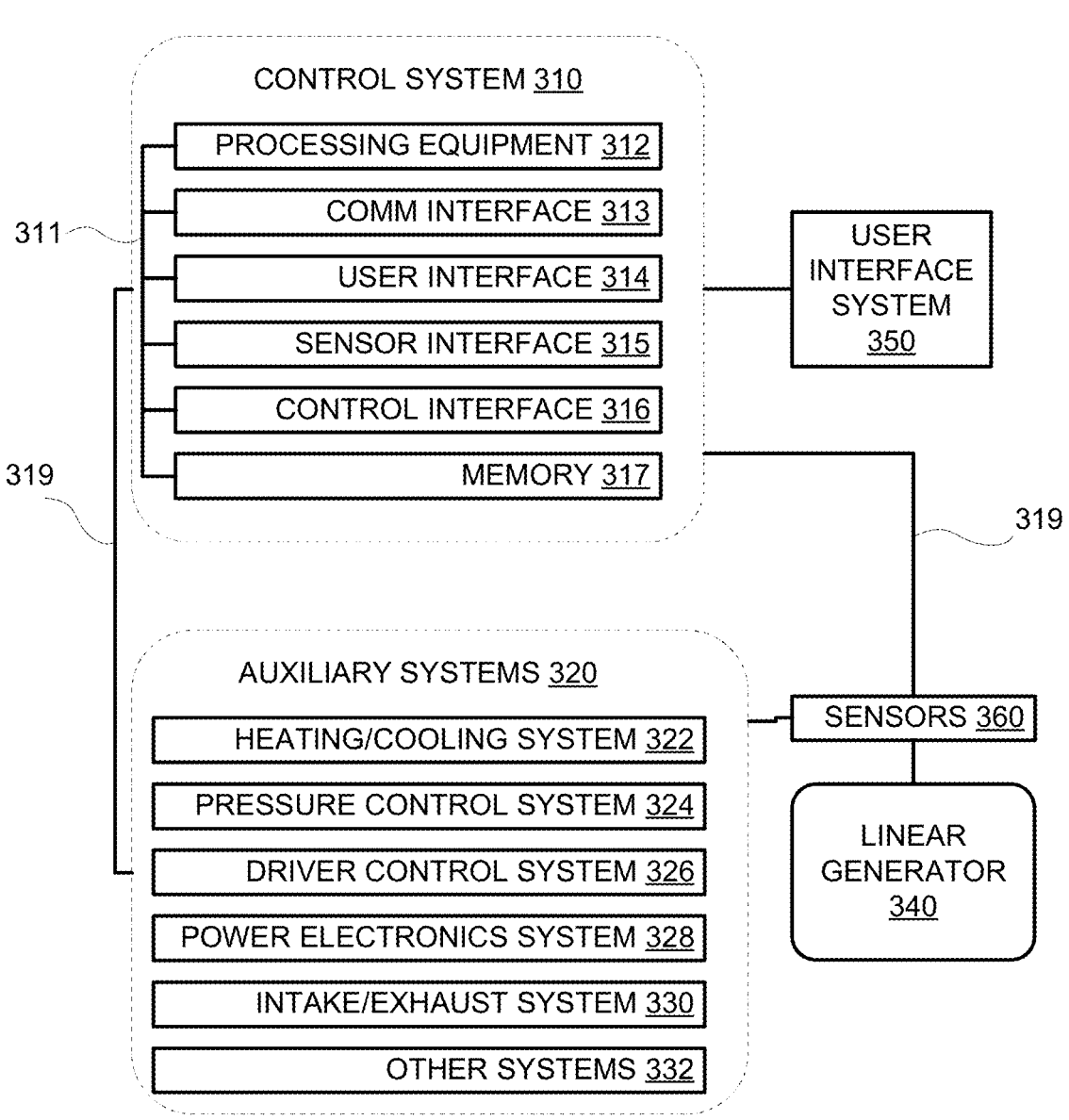
FIG. 3 shows a block diagram of an illustrative system having a control system for controlling a linear generator, in accordance with some embodiments of the present disclosure.

FIG. 3 is a block diagram of an illustrative system having control system 310 for controlling a linear generator 340, in accordance with some embodiments of the present disclosure. Linear generator 340 may be any suitable linear generator, for example, as described above with respect to FIGS. 1-2. Control system 310 may communicate with one or more sensors 360 coupled to linear generator 340. Control system 310 may be configured to communicate with auxiliary systems 320, which may be used to adjust operating aspects or properties of linear generator 340. In some embodiments, more than one linear generator may be controlled by control system 310. For example, control system 310 may be configured to communicate with auxiliary systems and sensors corresponding to any number of linear generators. In some embodiments, control system 310 may be configured to interact with a user via user interface system 350.

Control system 310 may include processing equipment 312, communications interface 313, user interface 314, sensor interface 315, control interface 316, memory 317 (e.g., for storing computer-executable instructions reference information, and/or data), any other suitable components or modules, or any combination thereof. Control system 310 may be implemented at least partially in one or more integrated circuits, ASIC, FPGA, microcontroller, DSP, computers, terminals, control stations, handheld devices, modules, any other suitable devices, or any combination thereof. In some embodiments, the components of control system 310 may be communicatively coupled via individual communications links or a communications bus 311, as shown in FIG. 3. Processing equipment 312 may include any suitable processing circuitry, such as one or more processors (e.g., a central processing unit), cache, random access memory (RAM), read only memory (ROM), any other suitable hardware components or any combination thereof that may be configured (e.g., using software, or hard-wired) to process information regarding linear generator 340, as received by sensor interface 315 from sensor(s) 360. Sensor interface 315 may include a power supply for supplying power to sensor(s) 360, a signal conditioner, a signal preprocessor, any other suitable components, or any combination thereof. For example, sensor interface 315 may include a filter, an amplifier, a sampler, and an analog to digital converter for conditioning and pre-processing signals from sensor(s) 360. Sensor interface 315 may communicate with sensor(s) 360 via communicative coupling 319, which may be a wired connection (e.g., using IEEE 802.3 ethernet, or universal serial bus interface), wireless coupling (e.g., using IEEE 802.11 "Wi-Fi", or Bluetooth), optical coupling, inductive coupling, any other suitable coupling, or any combination thereof. Control system 310, and more particularly processing equipment 312, may be configured to provide control of linear generator 340 over relevant time scales. For example, a change in one or more temperatures may be controllable in response to one or more detected generator operating characteristics, and the control may be provided on a time scale relevant to operation of the linear generator (e.g., fast enough response to prevent overheating and/or component failure, to adequately provide apex control as described below, to allow for shutdown in the case of a diagnostic event, and/or for adequate load tracking).

Sensor(s) 360 may include any suitable type of sensor, which may be configured to sense any suitable property or aspect of linear generator 340. In some embodiments, sensor(s) may include one or more sensors configured to sense an aspect and/or property of a system of auxiliary systems 320. In some embodiments, sensor(s) 360 may include a temperature sensor (e.g., a thermocouple, resistance temperature detector, thermistor, or optical temperature sensor) configured to sense the temperature of a component of linear generator 340, a fluid introduced to or recovered from linear generator 340, or both. In some embodiments, sensor(s) 360 may include one or more pressure sensors (e.g., piezoelectric pressure transducers, strain-based pressure transducers, or gas ionization sensors) configured to sense a pressure within a section of linear generator 340 (e.g., a reaction section, wherein the reaction may comprise a combustion reaction, or gas driver section), of a fluid introduced to or recovered from linear generator 340, or both. In some embodiments, sensor(s) 360 may include one or more force sensors (e.g., piezoelectric force transducers or strain-based force transducers) configured to sense a force within linear generator 340 such as a tensile, compressive or shear force (e.g., which may indicate a friction force or other relevant force information, pressure information, or acceleration information). In some embodiments, sensor(s) 360 may include one or more current and/or voltage sensors (e.g., an ammeter and/or voltmeter coupled to a LEM of linear generator 340) configured to sense a voltage, current, power output and/or input (e.g., current multiplied by voltage), any other suitable electrical property of linear generator 340 and/or auxiliary systems 320, or any combination thereof. In some embodiments, sensor(s) 360 may include one or more sensors configured to sense the position of the piston assembly and/or any other components of the generator, the speed of the piston assembly and/or any other components of the generator, the acceleration of the piston assembly and/or any other components of the generator, the rate of flow, oxygen or nitrogen oxide emission levels, other emission levels, any other suitable property of linear generator 340 and/or auxiliary systems 320, or any combination thereof.

Control interface 316 may include a wired connection, wireless coupling, optical coupling, inductive coupling, any other suitable coupling, or any combination thereof, for communicating with one or more of auxiliary systems 320. In some embodiments, control interface 316 may include a digital to analog converter to provide an analog control signal to any or all of auxiliary systems 320.

Auxiliary systems 320 may include heating/cooling (H/C) system 322, pressure control system 324, driver control system 326, power electronics system 328, intake/exhaust (TI/E) system 330, and/or any other suitable control systems 332. Heating/cooling system 322 may include a pump, fluid reservoir, pressure regulator, bypass, radiator, fluid conduits, electric power circuitry (e.g., for electric heaters), any other suitable components, or any combination thereof to provide cooling, heating, or both to linear generator 340. Pressure control system 324 may include a pump, compressor, fluid reservoir, pressure regulator, fluid conduits, any other suitable components, or any combination thereof to supply (and optionally receive) a pressure-controlled fluid to linear generator 340. Driver control system 326 may include a compressor, gas reservoir, pressure regulator, fluid conduits, control valves, any other suitable components, or any combination thereof to supply (and optionally receive) a driver gas to linear generator 340. In some embodiments, driver control system 326 may include any suitable components to control any of the driver (e.g., gas spring) components described above with respect to FIGS. 1-2. In some embodiments, other systems 332 include a valving system such as, for example, a cam-operated system, a solenoid system, or any other electromechanical device or electric machine to supply oxidizer and/or fuel to linear generator 340. Valving may also be used to regulate exhaust flow out of the generator, such as in a non-ported generator having, for example, a single piston assembly arrangement or dual piston assembly arrangement. Exhaust valves may be controlled with electromagnetic coils (e.g., linear motors) to allow unit-flow scavenging. In some embodiments, direct injection may be utilized, particularly where hydrogen reactions are involved.

User interface 314 may include a wired connection, wireless coupling, optical coupling, inductive coupling, any other suitable coupling, or any combination thereof, for communicating with one or more of user interface system 350. User interface system 350 may include a display, input device, mouse, audio device, remote interface accessed via website, mobile application, or other internet service, any other suitable user interface devices, or any combination thereof. In some embodiments, a remote interface may be remote from the generator but in proximity to the site of the generator. In other embodiments, a remote interface may be remote from both the generator and the site of the generator. For example, a display may include a display screen such as, for example, a touchscreen or any other suitable display screen that may provide graphics, text, images or other visuals to a user, or any combination of screens thereof. For example, user interface system 350 may include a touchscreen, which may provide tactile interaction with a user by, for example, offering one or more soft commands on a display screen. In some embodiments, control system 310 may be configured to receive one or more user inputs to provide control. For example, in some embodiments, control system 310 may override control settings based on sensor feedback and base a control signal to auxiliary systems 320 on one or more user inputs to user interface system 350. In a further example, a user may input a set-point value for one or more control variables (e.g., temperatures, pressures, flow rates, work inputs/outputs, or other variables), and control system 310 may execute a control algorithm based on the set-point value.

In some embodiments, operating characteristics (e.g., one or more desired property values of linear generator 340 or auxiliary systems 320) may be pre-defined by a manufacturer, user, or both. For example, particular operating characteristics may be stored in memory 317 of control system 310 (e.g., or in memory of processing equipment 312), and may be accessed to provide one or more control signals. In some embodiments, one or more of the operating characteristics may be changed by a user, computer instructions, received sensor values or other inputs, any other suitable criterion, or any combination thereof. Control system 310 may be used to maintain, adjust, or otherwise manage those operating characteristics. For example, control system 310 may be used to alter operation based on environmental conditions such as temperature and pressure.

In some embodiments, control system 310 computes a position-force trajectory for the one or more piston assemblies of a linear generator (e.g., free-piston assemblies such as translators 110 and 120 of generator assembly 100 of FIG. 1) based at least in part on a desired generator performance (e.g., a desired apex position) and a current position of one or more piston assemblies. Based on the calculated position-force trajectory, control system 310 causes displacement of the one or more piston assemblies by causing power electronics system 328 to apply phase currents, which in turn apply particular electromagnetic forces to the one or more piston assemblies over a specified time or position intervals. The calculation of each position-force trajectory by control system 310 may be computed without regard to a deviation from a previously determined trajectory (position-force, time-position, or any other suitable trajectory). Control system 310 may calculate a position-force trajectory when a particular trigger is activated (e.g., in response to a particular event, clock pulse, model iteration), repeatedly over a stroke or cycle of the piston assemblies, after changes to the operating state of the generator, or any combination thereof. In some embodiments, control system 310 may also calculate a position-force trajectory without regard to the timing of a desired generator performance. In some instances, control system 310 may calculate a position-force trajectory based on the operating state of the generator. In some embodiments, control system 310 may estimate a current operating parameter of the generator based on a preceding force that was calculated as part of a previous position-force trajectory or based on a preceding force that was applied to the one or more piston assemblies. In certain instances, control system 310 may calculate a position-force trajectory using a closed-form solution, a numerically iterative solution, or a combination of both. In embodiments with multiple piston assemblies, control system 310 may, in addition to calculating a position-force trajectory for each respective piston assembly, also calculate synchronization forces for the multiple piston assemblies and cause certain forces to be applied to the multiple piston assemblies based on the synchronization calculations to synchronize the movements of the multiple piston assemblies as desired. In some embodiments, the control system 310 may employ a hybrid control strategy that switches between a position-force trajectory control technique and another control technique (e.g., a control technique that relies on the calculation of deviation from a previously determined trajectory) depending on the operating state of the generator. Control system 310 may cause synchronization between translators of a particular linear generator (e.g., translators 110 and 120 may be synchronized to each other to result in opposed motion), synchronization or phase offset among translators of two or more linear generators (e.g., among translators of cores 210, 220, and 230 of FIG. 2), or a combination thereof.

Control Aspects

The control systems and methods described herein may be used for synchronizing or otherwise controlling the phase (e.g., as phase corresponds to a position trajectory) between more than two cores. For an exemplary embodiment, two cores are illustrated herein.

One embodiment of core-sync achieves frequency and phase control by manipulating the BDC (Bottom Dead Center) apex position target of one generator in order to lock into a particular phasing with respect to the other generator. This manipulation of BDC is only possible on a linear generator that is free to control the BDC position due to a lack of mechanical linkages constraining BDC to a fixed point (e.g., via a slider-crank or other mechanical mechanism).

Figure 4:
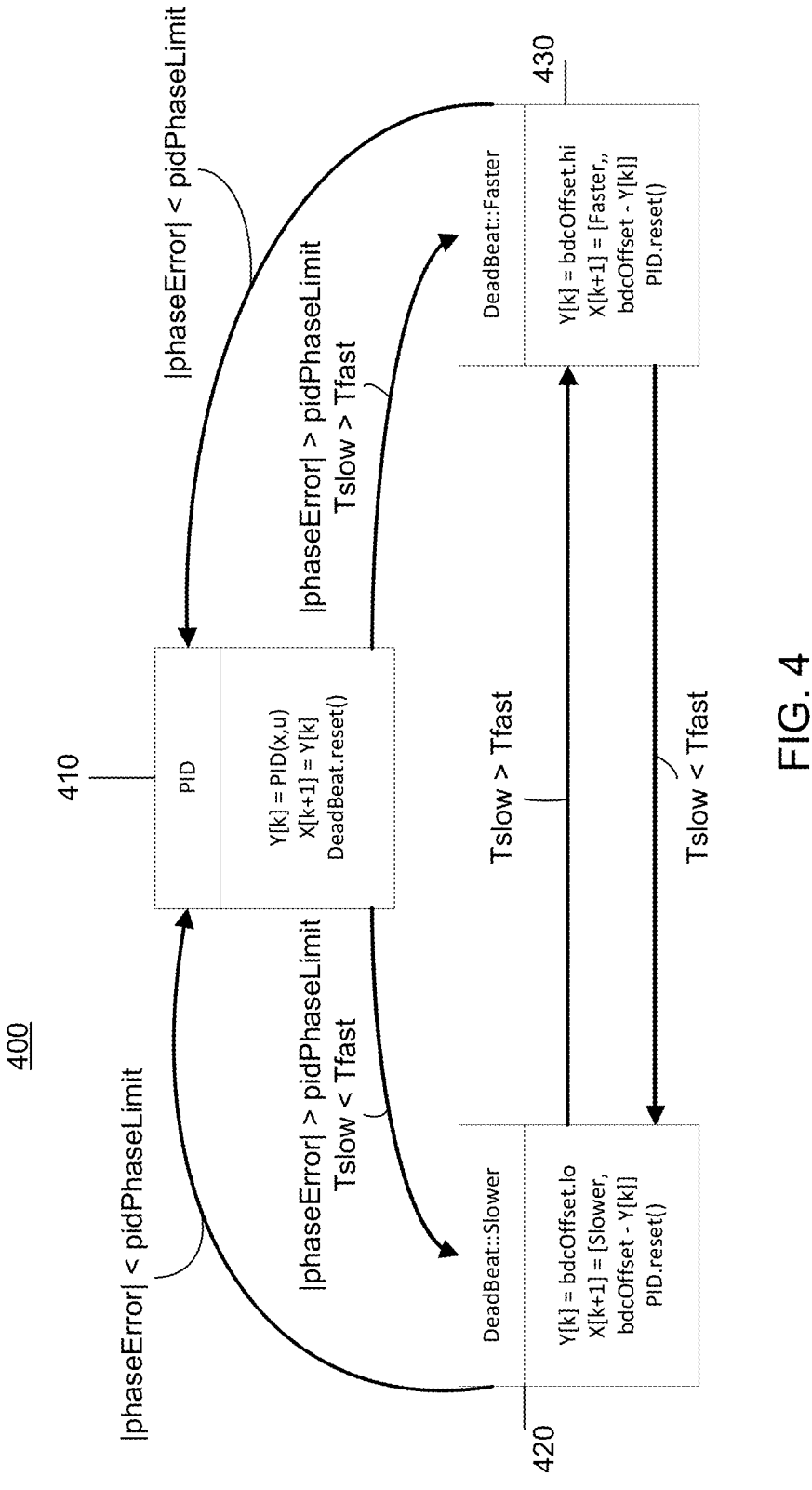
FIG. 4 illustrates an illustrative control technique for adjusting a BDC time, in accordance with some embodiments of the present disclosure.

FIG. 4 illustrates an exemplary control technique for adjusting a BDC time, in accordance with some embodiments of the present disclosure. For example, as illustrated in FIG. 4, state-machine diagram 400 shows three control modes (e.g., distinct modes) of a core sync algorithm. While operating in state 410, the system implements proportional-integral-derivative (PID) controller, which may be used for fine control near a desired phase (e.g., small offsets or no offsets), while in two other states 420 and 430, the dead-beat modes (e.g., slower and faster) may provide the fastest time to phase-lock by using full control authority. The state transitions illustrated in diagram 400 show the transition criteria, for example, from PID to deadbeat are slower if the phase error is over the PID phase error limit value and if the time to converge is estimated to be smaller by going slower (e.g., Tslow) than faster (e.g., Tfast). While operating in each state, illustrative state update calculations are shown.

In some embodiments, core sync control uses the last BDC time of the leader core (the core not performing active sync or not modifying its behavior to achieve the desired phase offset) and the follower core (the core modifying its behavior to achieve the desired phase offset i.e., the core performing active sync) to determine the cycle phase difference of the two cores (e.g., timing of BDC, TDC, position, any other suitable operating parameter). For example, in some embodiments, if the cores both meet their respective BDCs at the same time, they are considered in phase. If, however, one core meets its BDC at the same time that the other core meets its TDC, then the cores are 180 degrees out of phase. However, in other embodiments, the phase may be determined by splitting the cycle in time rather than location of the pistons because the compression and expansion strokes are not of the same time duration. Control then uses the desired phase difference to determine the error and operates on this difference. In some embodiments the error is the difference between the current phase difference and the desired phase difference, which may be zero or any other phase difference. The current phase difference may be measured, estimated, calculated, or any combination thereof. The system may implement deadbeat control with knowledge of each core's frequency, which allows the control system to choose whether to make adjustments faster or slower in order to minimize convergence time to zero phase error. In some embodiments, the control system switches over to proportional-integral (PI) control when the error is sufficiently low (e.g., below a threshold value) in order to converge toward zero phase error. The bi-modal controller is always active when the generator is reacting.

The two modes are deadbeat and PID control. Deadbeat mode is used to maximize authority of the control while minimizing the dynamics of the controller when the error is large. PID control mode is used to home in on a particular phase with minimal chatter. The controller decides among these two methods, with hysteresis, by inspecting the phase error which is the difference between the phase target and phase calculated. The decision to change between deadbeat mode and PID mode control is done at every generator cycle.

Figure 5:
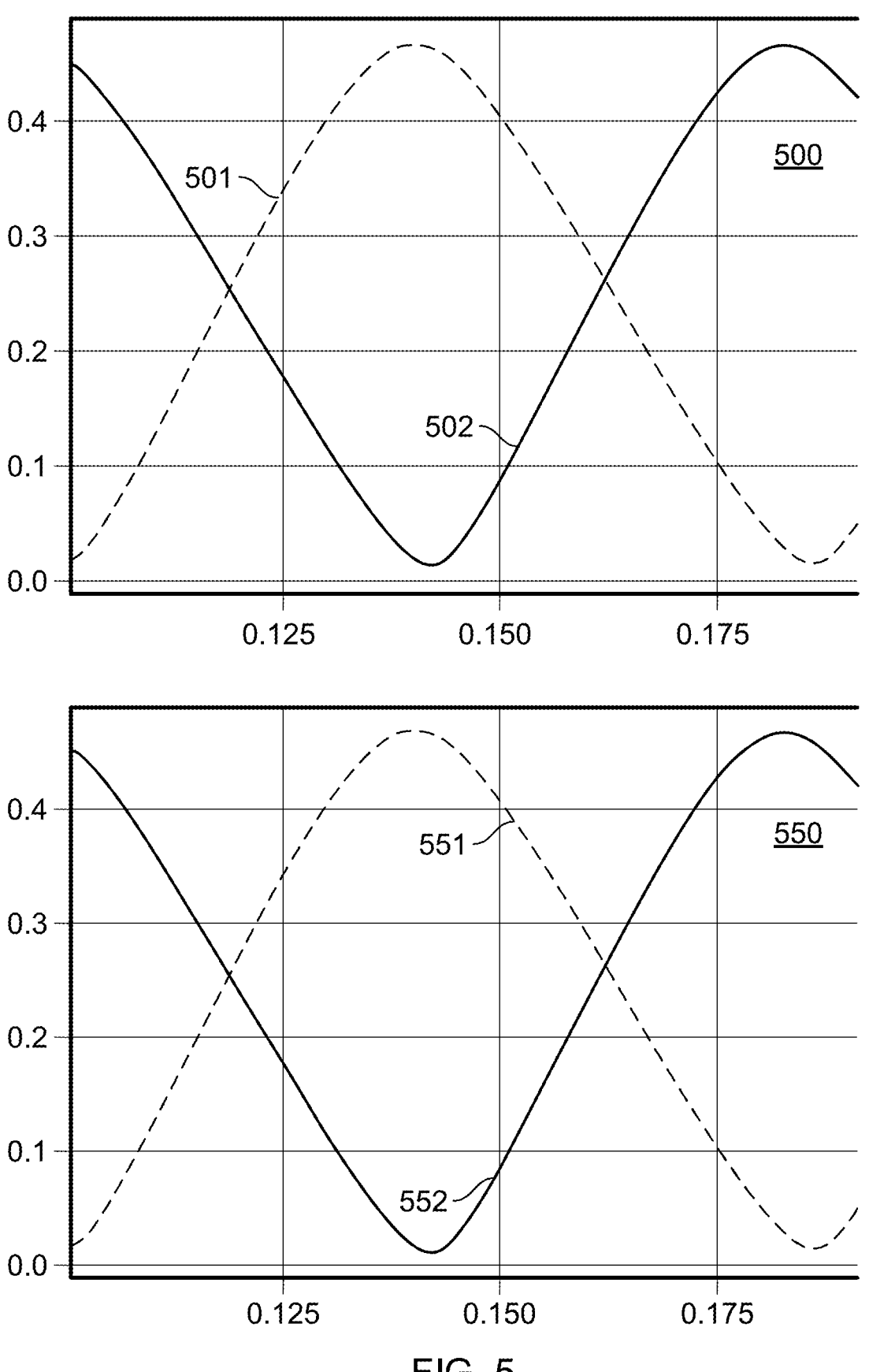
FIG. 5 shows two plots of illustrative positions versus time for translators of two cores, in accordance with some embodiments of the present disclosure.

FIG. 5 shows two plots 500 and 550 of illustrative positions versus time for translators of two cores, in accordance with some embodiments of the present disclosure. Plot 500 shows position versus time "x(t)" traces 501 and 502 for intake-side translators on core A (e.g., the follower here), and core B (e.g., the leader here), respectively. Plot 550 shows similar traces 551 and 552 for the exhaust translators of cores a and b, respectively. Traces 501 and 502, along with traces 551 and 552, illustrate translators of a linear generator successfully synchronizing two cores with a 180-degree offset. The phase offset is illustrated by the position vs time traces (e.g., traces 501, 502, 551, and 552) by the opposing symmetry (e.g., the translators of core A reach TDC when the translators of core B reach BDC and vice versa) indicating that core sync being implemented.

Figure 6:
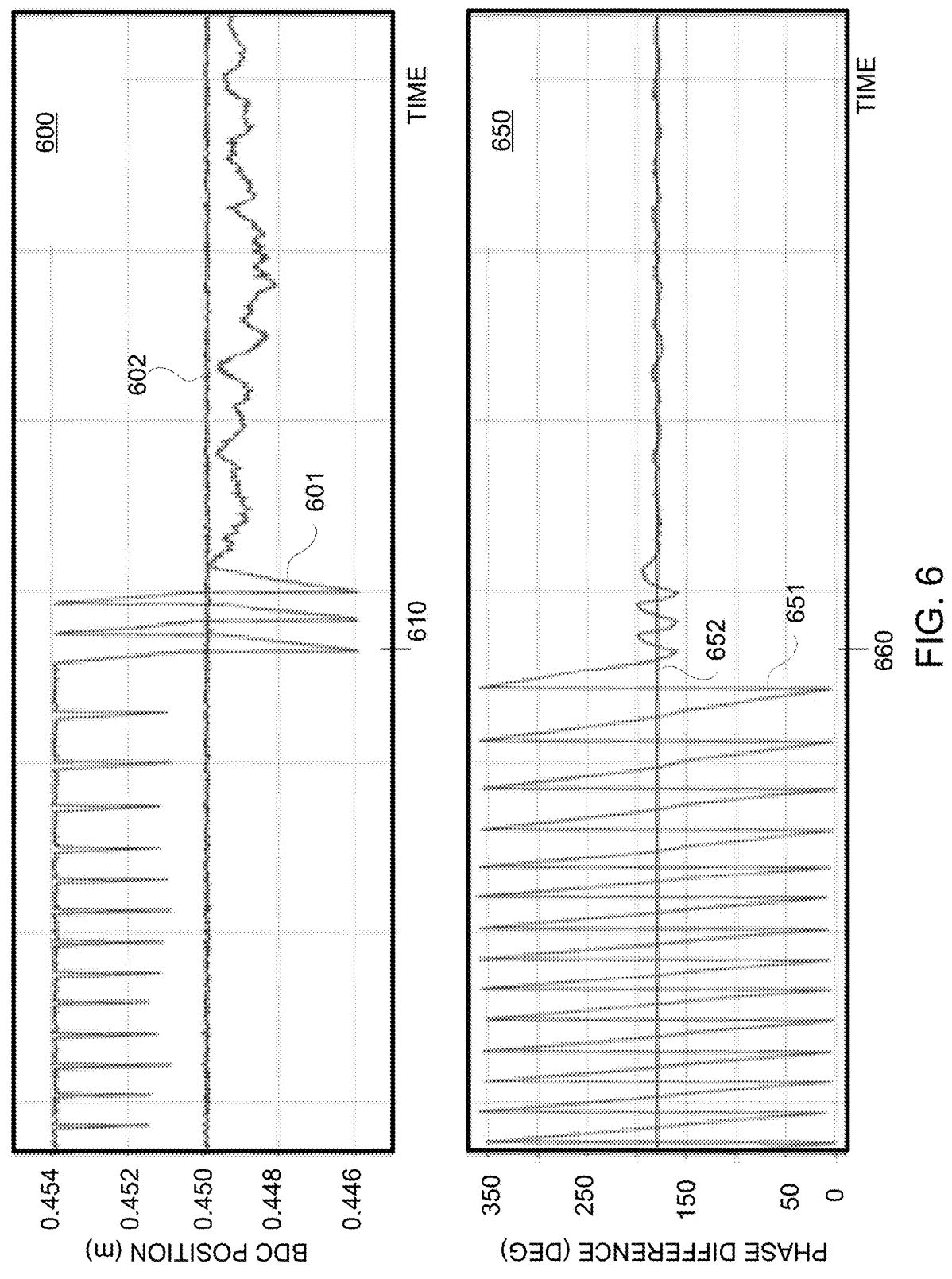
FIG. 6 shows two plots illustrating controller behavior during transition from lack of authority to having authority, in accordance with some embodiments of the present disclosure.

FIG. 6 shows two plots 600 and 650 illustrating controller behavior during transition from lack of authority to having authority, in accordance with some embodiments of the present disclosure. Plot 600 shows translator BDC position (i.e., trace 601) and a nominal BDC position (i.e., trace 602). As illustrated, trace 601 exhibits fluctuations in BDC position. At time 610, core sync is activated, and trace 601 exhibits a change in behavior (e.g., more closely achieving the nominal BDC position of trace 602). Plot 650 shows a measured phase difference between two cores (e.g., one of which corresponds to the BDC position of plot 600), as measured by the follower core with the phase difference shown by trace 651 and the desired phase shown by trace 652. The time axis is the same for plots 600 and 650 (e.g., time 610 is the same as time 660) and illustrates that the controller does not have enough authority to maintain core sync prior to time 610 and then is able to synchronize the cores after time 610 (e.g., by applying deadbeat control). Plots 600 and 650 demonstrate deadbeat control, which can be marked by a constant value corresponding to the authority limit, and the PID mode marked by tight control of the phase difference. As illustrated in plot 650, (i) before time 660, the phase difference drifts over time (e.g., resetting at "0" degrees, indicating one core has a slightly faster frequency), and (ii) after time 660, the phase difference between the cores is maintained at about 180 degrees using core sync.

Additionally, the PID dynamics causing the dips prior to time 610. This is caused by the controller passing through the region of low phase error which activates the PID control instead of the deadbeat control. The PID controller winds up, but due to the lack of authority falls back into deadbeat control. The deadbeat control is much quicker to realize the lack of authority and resumes commanding a deeper BDC to go faster to catch up to the lead core. Eventually, the lead core slows down enough for the follower core (the core doing the sync operation) to lock into the phase target

Communication Aspects

A fundamental challenge for synchronizing cores is that of sharing information between the control computers (for example when linear generator cores are controlled by separate computers). There are multiple strategies for communicating the time of a BDC event to the other core using the core-to-core link as the main communication link and falling back to Message Queuing Telemetry Transport protocol (hereafter "MQTT protocol") when the main link does not work. While the present disclosure is described as using the MQTT protocol, it will be understood that any other suitable communication protocol may be used, such as a publisher/subscriber architecture implemented over an ethernet communication network protocol or any protocol suitable for communication across a relatively high latency channel may be utilized in place of MQTT protocol.

Core to Core Link

In some embodiments, the control system is configured to achieve low latency communication (e.g., for transmitting information via a core-to-core link). For example, the fastest way to transmit data may be to send position information associated with one core from a first control module to another control module (e.g., associated with another core) over a high-speed data link wherein the core performing the synchronization is configured to calculate the BDC position of itself and the other core. The other core data looks like another set of inputs into the BDC calculation. In some embodiments, the link could be SPI, Ethernet, RS-485, wireless, or any other suitable communication link with acceptable bandwidth and latency (e.g., latency well below the primary core cycle frequency with high-reliability).

MQTT Protocol Communication

An alternative approach is to send the data from one core to the other via a slower communication link. This could be valuable for systems that already have a communication channel because it would not require additional hardware. However, this method may be challenging because it can incur a significant amount of latency in the information delivered to the algorithm. To account for this, the algorithm can track the time skew/drift between the cores and then project the latent BDC time of the other core to align the current BDC time of the core the algorithm runs on. This technique ensures that the two times delivered to the control algorithm are within a cycle period (e.g., within one generator cycle of the reference core from TDC to BDC back to TDC) of each other, and therefore the control can track the phase difference of the cores cycle to cycle.

In some embodiments, the communication strategy may comprise reading the encoders corresponding to each core (e.g., measure each core's position or receive position information from control modules associated with each core). The position of each core as determined based on data or information received from the encoders may be processed to determine relative differences in position of each core indicating whether or not the cores are synchronized (e.g., each core position may be measured relative to the other core's position).

In some embodiments, the communication strategy may comprise sending a digital signal that changes. For example, the signal may comprise information indicating that synchronization detection and modification may be off during expansion and conversely may indicate that synchronization detection and modification are on during compression. The rising and falling edges of the signal may provide a very high-time resolution communication of the TDC and BDC, enabling precision detection, reporting, and processing of modification instructions. The signal may also be utilized to report statuses, data, or component states during other points in the cycle (e.g., peak velocity in either direction or the crossing of port edges).

In some embodiments, the communication strategy may comprise the use of another computing device to receive information from each core and each core's corresponding monitoring/reporting components. The additional computing device may process any received data, signal, or other information in order to generate and provide commands to each core controller.

In some embodiments, the communication strategy may comprise using a single controller for monitoring and controlling a plurality of cores. This may reduce computation complexity and may also reduce timing associated with the distribution of modification instructions for each of the plurality of cores.

Figure 7:
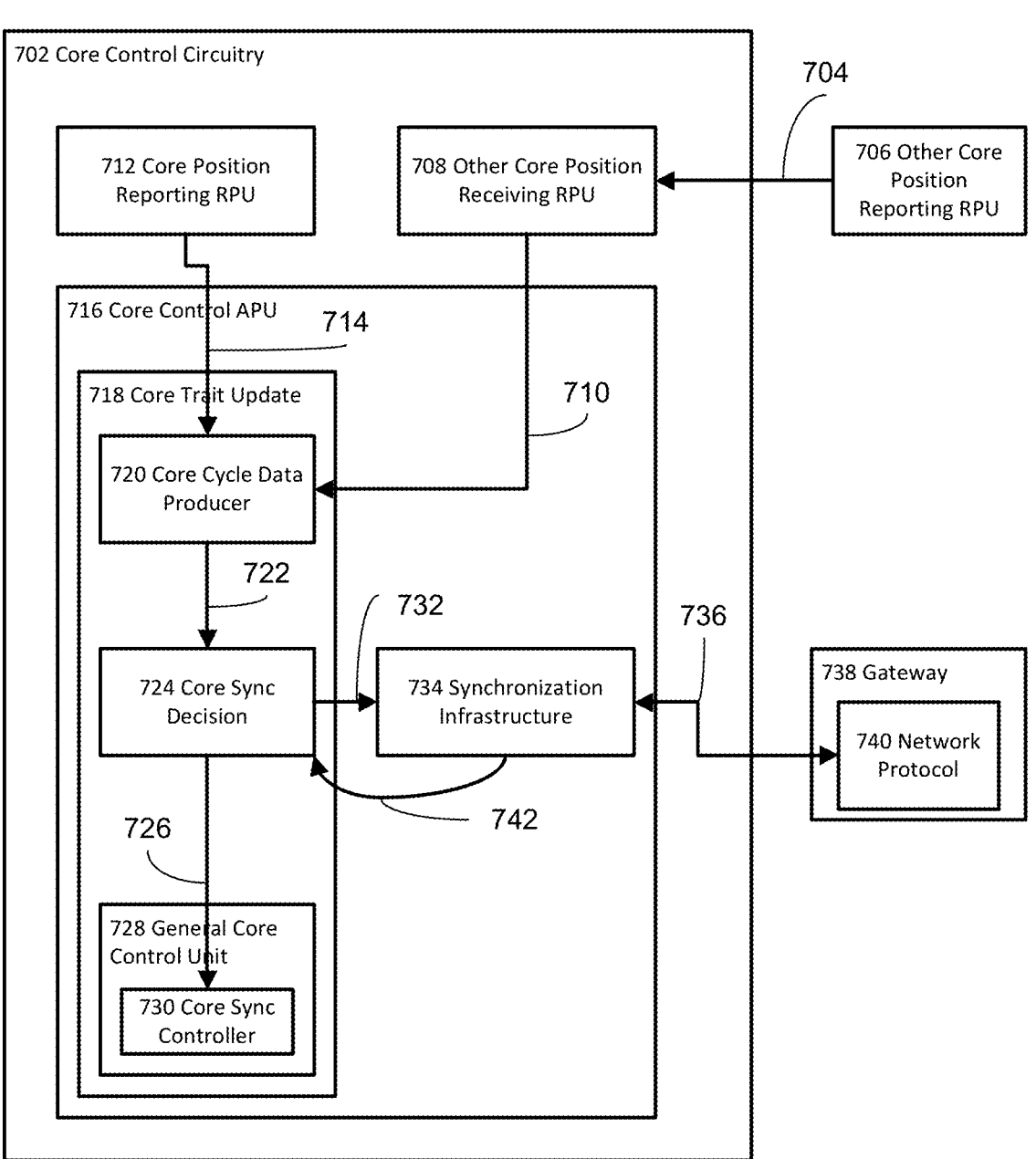
FIG. 7 shows a block diagram illustrating an interface description between various pieces of software that are running a core-sync controller, in accordance with some embodiments of the present disclosure.

FIG. 7 shows a block diagram illustrating an interface description between various pieces of software that are running a core-sync controller, in accordance with some embodiments of the present disclosure. For example, FIG. 7 may correspond to an illustrative communications strategy for reporting and processing BDC time of different cores configured to be synchronized by a control system (e.g., control systems comprising any or all of the components of FIGS. 1-3, and any combination thereof). In some embodiments, control communication system 700 may utilize a communication strategy based on MQTT protocol. In some embodiments, control communication system 700 may utilize a communication strategy based on controller-to-controller protocol (hereafter "C2C protocol"). In some embodiments, a first portion of control communication system 700 may utilize MQTT protocol while a second portion of control communication system 700 may utilize C2C protocol.

Control communication system 700 comprises core control circuitry 702 that is communicably coupled to at least one other core position reporting real-time processing unit (hereafter "RPU") 706 as shown by communication path 704. While the present disclosure is described as using an RPU, it will be understood that any other processing unit may be used, such as a remote control unit (e.g., RCU), heterogenous hex-core processor, or any processor configured to interface with a core control computer. Core control circuitry 702 may correspond to a central control unit for a first core while other core position reporting RPU 708 may correspond to a portion of control circuitry corresponding to a second core that requires synchronization with the first core (e.g., as exemplified by the systems shown in FIGS. 1 and 2). Core control circuitry 702 further comprises other core position receiving RPU 708, core position reporting RPU 712, and core control accelerated processing unit (hereafter "AP") 716. While the present disclosure is described as using an APU, it will be understood that any other processing unit may be used, such as a heterogenous hex-core processor or any processor configured to interface with a core control computer. Other core position receiving RPU 708 is configured to receive information via communication path 704 related to the position of a second core in order to determine whether a first core, corresponding to core control circuitry 702, requires a modified instruction to enable synchronization of the first core and the second core based on the first core position as reported by core position reporting RPU 712. In some embodiments, communication path 704 may conform to C2C protocol and may be configured to transmit data in the form of a communication signal reporting a second core position.

Each of core position reporting RPU 712 and other core position receiving RPU 708 transmit core position data for a first core and a second core, respectively, to core control APU 716 via communication path 714 and communication path 710, respectively. Communication path 714 may comply with either MQTT protocol or C2C protocol when transmitting data in the form of a communication signal. Communication path 710 may comply with C2C protocol and may transmit an original or modified version of the signal received through communication path 704.

Core control APU 716 further comprises core trait update module 718. Core trait update module 718 may be configured to receive core data and generate instructions for modification of a core position or core trajectory in order to synchronize the core with the position and/or trajectory of a second core (e.g., each of the mentioned parameters may correspond to a core trait which may require updating to enable appropriate synchronization of cores). Core trait update module 718 comprises core cycle data producer 720, core sync decision module 724, and general core control unit 728. Core cycle data producer 720 is configured to receive signals comprising data and/or messages through communication paths 710 and 714. Core cycle data producer 720 may receive data and/or messages through communication path 710 only when control system 700 is configured to comply with C2C protocol. Core cycle data producer 720 may utilize data received from both communication paths 704 and 710 to transmit a signal along communication path 722 comprising one or more flags indicative of either one or both of the two cores realizing a BDC position. The signal transmitted along communication path 722 may be received by core sync decision module 724, which is configured to generate instructions comprising at least one of a flag indicating a need to synchronize cores, a flag indicating the cores are synchronized, and/or BDC timing data (e.g., time stamps corresponding to the BDC status of each of the cores or a relative time difference of each of the BDC statuses of each core) in order to transmit a signal comprising data along communication path 726. The signal transmitted along communication path 726 can be utilized to generate a modification to the control of the core.

General core control unit 728 is configured to receive transmitted messages, data, and signals along communication path 726. General core control unit 728 may be configured to comply with either or both of MQTT protocol or C2C protocol, or any protocol suitable for communication across a relatively high latency channel. General core control unit 728 comprises core sync controller 730, which is configured to receive transmitted messages, data, and signals from communication path 726. In some embodiments, core sync controller 730 is configured to process data corresponding to a signal or message in order to generate an instruction for a controller corresponding to general core control unit 728 that enables a modification of either a position or trajectory of a core associated with general core control unit 728.

In some embodiments, core control APU further comprises synchronization infrastructure 734 (e.g., in embodiments where control communication system 700 is configured to be compliant with MQTT protocols). Synchronization infrastructure 734 is configured to receive signals, messages, and/or data along communication path 732 from core sync decision module 724. Synchronization infrastructure 734 is communicably coupled to gateway 738. Gateway 738 may be configured to translate or modify messages received from synchronization infrastructure 734 through communication path 736 such that the message can be transmitted, received, and/or processed by communication circuitry corresponding to a second core that should be synchronized with the first core associated with control communication system 700. Gateway 738 further comprises network protocol 740, which may comprise transmitting, processing, and other protocols corresponding to the second core (e.g., network protocol 740 may comprise a broker compliant with MQTT protocols). Communication path 736 may also be utilized by gateway 738 based on network protocol 740 to provide a message, signal, and/or data corresponding to a sync requirement flag or BDC status from the second core to synchronization infrastructure 734. The received message, signal, and/or data is processed by synchronization infrastructure 734 and transmitted as a signal comprising a message indicating whether a sync requirement flag or sync status is reported from the first core or the second core.

Control Strategies

Figure 8:
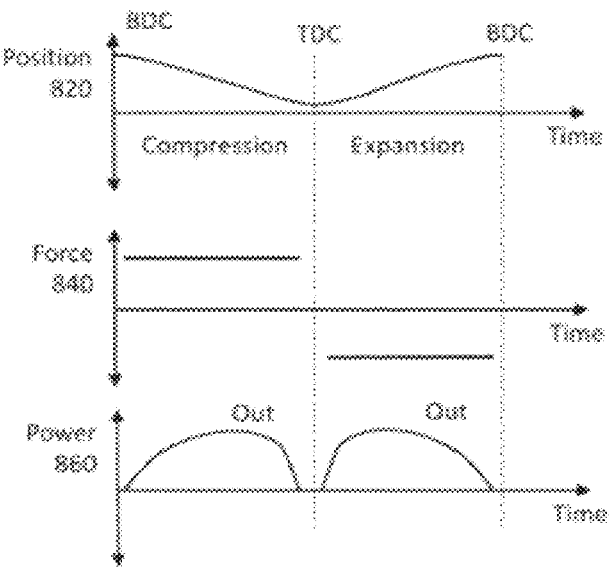
FIG. 8 illustrates exemplary position, force, and power diagrams of a free-piston generator over a compression and an expansion stroke, in accordance with some embodiments of the present disclosure.

FIG. 8 illustrates the position, force, and power of a linear generator, in accordance with some embodiments of the present disclosure. As shown, FIG. 8 illustrates exemplary position 820, force 840, and power 860 diagrams over time for a linear generator with a two-stroke piston cycle including a compression stroke and an expansion stroke. With reference to position diagram 820, as labeled in FIG. 8, for reference purposes, the positive axial direction corresponds to the direction from TDC to BDC (e.g., away from the center of the reaction cylinder). For example, in the free-piston assemblies of FIGS. 1-2, the centerline would correspond to the origin of the vertical axis, and the direction away from the centerline would be the positive direction for each free-piston assembly (e.g., such as translators 110 and 120 of FIG. 1). As can be seen by position diagram 820, the piston assembly starts the compression stroke at BDC and progresses to TDC, at which point the expansion (or power) stroke begins. During the expansion stroke, the piston assembly progresses back to BDC.

With reference to force diagram 840, the force is positive when applied in a direction from TDC to BDC. For example, in the free-piston assemblies of FIGS. 1-2, force applied in the direction away from the centerline would be a positive force. As can be seen in force diagram 840, during the compression stroke, a relatively constant positive force may be applied to the piston assembly, and during the expansion stroke, the force may be negative (in the direction towards the centerline), allowing the LEM to extract energy during both strokes. It will be understood that the force applied need not be constant, and that in some embodiments, a variable force profile may be applied, for example, to produce a relatively constant power output. It will also be understood that in some embodiments, and as depicted herein, forces may not be applied when the piston assembly velocity is relatively low, due to the inefficiency of doing so.

The power output is the negative product of the force and velocity of the piston assembly. Referring specifically to power diagram 860, it can be seen that, in the ideal case illustrated, no power need be input to the system in order to perform the compression and expansion strokes of the piston cycle. Rather, as described above, in the ideal case, there is sufficient energy stored in the at least one driver section during the expansion stroke to perform the subsequent compression stroke without additional energy input into the system during the compression stroke.

Figure 9:
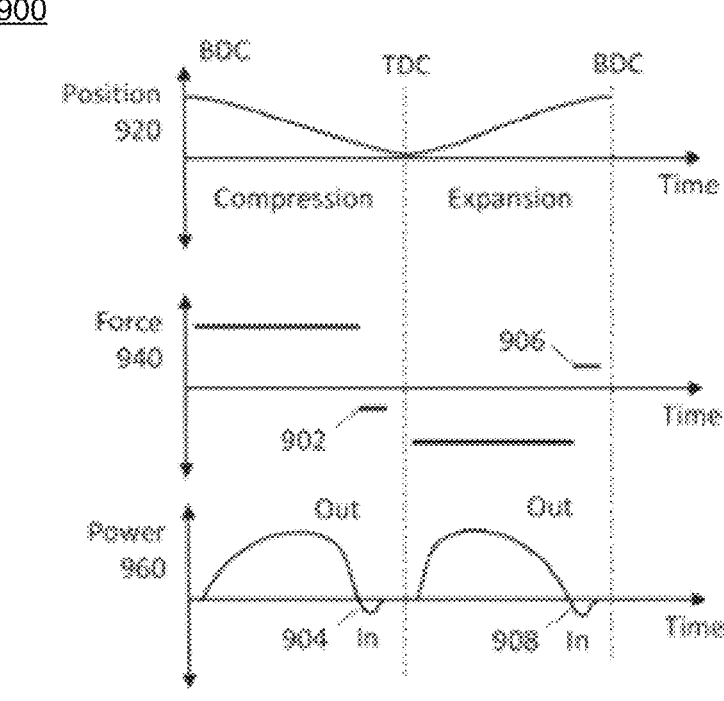
FIG. 9 illustrates other exemplary position, force, and power diagrams of a free-piston generator over a compression and an expansion stroke, in accordance with some embodiments of the present disclosure.

While in an ideal scenario, it may be desirable to avoid any power input during the compression and expansion strokes as described with respect to FIG. 8, in some embodiments it may be necessary or desirable to provide some power input. Accordingly, FIG. 9 illustrates the position, force, and power of a linear generator, in accordance with some other embodiments of the present disclosure. Similar to FIG. 8, FIG. 9 illustrates exemplary position 920, force 940, and power 960 diagrams over time for a linear generator with a two-stroke piston cycle including a compression stroke and an expansion stroke. While the position diagram 920 is generally similar to that of position diagram 820 illustrated in FIG. 8, it will be understood that the force diagram 940 and the power diagram 960 may differ from those illustrated in FIG. 8. With reference to force diagram 940 during the compression stroke, it can be seen at 902 that a force may be applied in the opposite direction from the originally applied force for a brief period. This is also reflected in power diagram 960, where a negative power showing power input for the same brief period may be seen at 904. While this force application and power input may occur for a number of reasons, in some embodiments, it may be done in order to control the speed of the piston assembly or otherwise ensure that the piston assembly reaches the appropriate or desired TDC position before the subsequent expansion stroke. For example, a force may be applied to increase the speed of the piston assembly. Similarly, with further reference to force diagram 940 during the expansion stroke, it can be seen at 906 that a force may be applied in the opposite direction to the rest of the expansion stroke for a brief period, which is also reflected in power diagram 960, where a negative power showing power input for the same brief period may be seen at 908. As described above, this applied force and input power may occur for a number of reasons, but in some embodiments, force may be applied in this way and power input in order to control the speed of the piston assembly or otherwise ensure that the piston assembly reaches the appropriate or desired BDC position before the subsequent compression stroke. For example, a force may be applied to increase the speed of the piston assembly as described above.

Although the provision of input power during compression stroke and/or expansion stroke described with respect to FIG. 9 is not necessarily ideal operation, it will be understood that the net electrical energy output over each stroke is still greater than zero (i.e., there is no net electrical energy input over each stroke). This is evident from power diagram 960, in which it can be seen that the integral over each stroke, represented by the area of the curve above zero subtracted by the area of the curve below zero, is substantially greater than zero. Accordingly, the amount of electrical energy output by the system over each stroke is greater than the electrical energy input to control the piston assembly position as described above. As used herein, the "net electrical energy" refers to the electrical energy transfer into or out of the LEM such as that described above with respect to FIGS. 1-2. In some embodiments, the LEM may include a stator coupled to power electronics (including, e.g., a DC bus, IGBTs, capacitors, and/or any other suitable components), batteries, and/or a grid-tie inverter. Accordingly, in some embodiments, while some electrical energy may be input into the LEM via power electronics, batteries, and/or a grid-tie inverter coupled to the LEM, the net electrical energy over a given stroke as described above would be output from the LEM to the power electronics, batteries, and/or grid-tie inverter.

While a linear generator may be operated with no net electrical input over a given stroke, it is understood that the principles of the present disclosure can be applied to any suitable linear generator, including a linear generator that operates with net electrical input during a stroke, such as during a compression stroke (e.g., during start-up).

The trajectories of FIGS. 8-9 may be applied to a two-piston, single-reaction section linear generator (e.g., a two-stroke free-piston generator). Described below, and illustrated in the corresponding figures, is a control system applicable to a free-piston linear generator generally. Accordingly, as described above, the control system is applicable to other free-piston generator architectures (e.g., reaction generators relying on combustion reactions), such as those described in the previously referenced and incorporated U.S. Pat. No. 8,662,029. As would be appreciated by those of ordinary skill in the art, various modifications and alternative configurations may be utilized, and other changes may be made, without departing from the scope of the disclosure. For example, in addition to the two-piston architectures described above with respect to FIGS. 1-2, the control system described herein is applicable to, for example, single-piston architectures. Similarly, in addition to a two-stroke application, the control system described herein is also applicable to, for example, linear generators operating on a four-stroke cycle.

Figure 10:
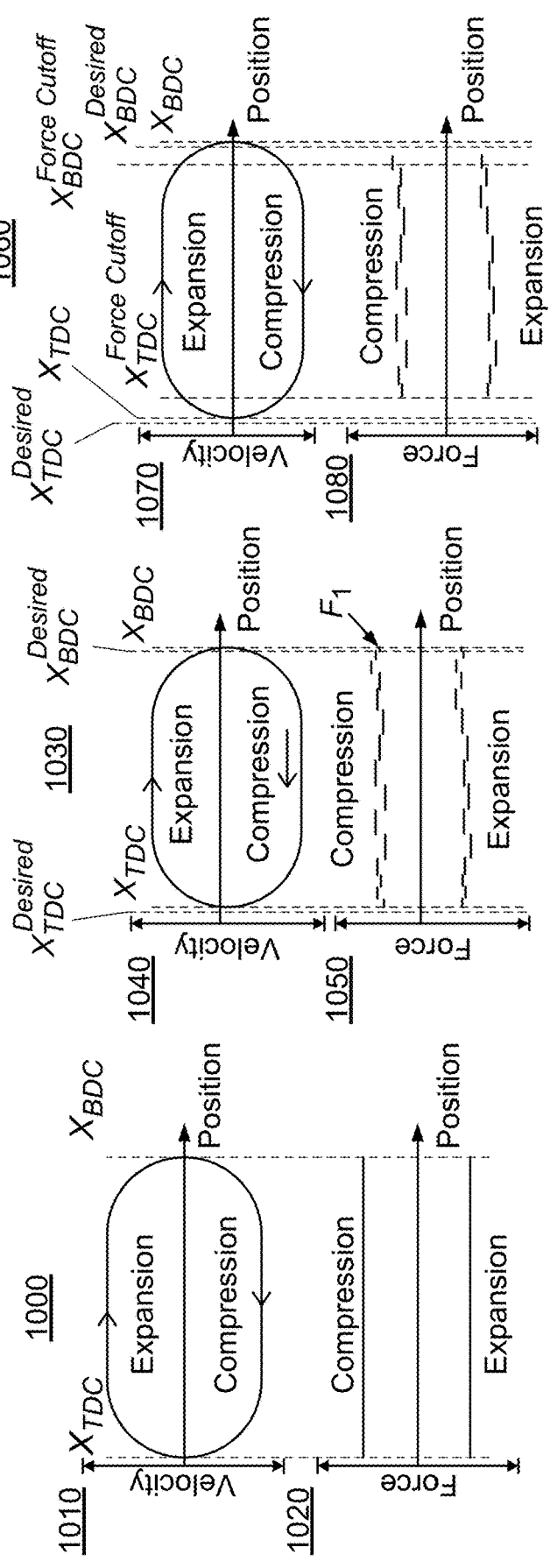
FIG. 10 illustrates exemplary position-velocity and position-force trajectories of a free-piston generator over a compression and an expansion stroke, in accordance with some embodiments of the present disclosure.

FIG. 10 shows exemplary position-velocity and position-force trajectories (e.g., trajectories 1010 and 1020 of panel 1000, respectively) of a piston assembly in a linear generator over a compression stroke and an expansion stroke. To illustrate, the force values shown in 1020 correspond to the force values calculated by the control system 310 of FIG. 3 (e.g., or controller 180 of FIG. 1, control system 250 or controllers 211, 221, and 231 thereof of FIG. 2), and applied to the piston assembly by exerting an electromagnetic force on the piston assembly via a LEM. The profiles illustrated in FIG. 10 are idealized, simplified, or both for purposes of clarity and ease of illustration. It will be understood that actual profiles may be different. Electromagnetic forces are referred to herein as LEM forces, LEM force values, motor forces, motor force values, forces, or force values. With reference to FIG. 10 and the proceeding trajectory figures, the positive direction corresponds to the direction from TDC to BDC (e.g., a positive velocity corresponds to the piston assembly moving from TDC to BDC and a positive force corresponds to a force being applied in the direction toward BDC).

Additionally, with reference to FIG. 10 and the proceeding trajectory figures, the zero position point corresponds to the center line for an opposed-piston linear generator (e.g., FIGS. 1-2) or the reaction section end (i.e., the head of the reaction section) for a single-piston linear generator (e.g., FIG. 5). As shown in FIG. 10, the piston assembly cycles between BDC and TDC (e.g., apex positions) while the LEM applies a force in the opposite direction of the motion of the piston assemblies, thereby producing net electrical energy output over both strokes. Producing net electrical energy output over both strokes requires that a driver section is sized such that it can store enough energy from an expansion stroke to provide more than enough energy required to perform the subsequent compression stroke. While this paradigm is generally assumed in the following discussion, it will be understood that the control techniques disclosed herein can be applied to linear generators in which the driver section is sized such that net electrical energy input is required during the compression stroke and to linear generators in which there is no driver section and all of the energy required to perform a compression stroke is provided by a LEM. The single motor force values for each stroke shown in trajectory 1020 are an idealized representation of how a linear generator could operate. The following is a discussion of specific embodiments in which control system 310 may be used to control the displacement of a piston assembly in a linear generator to achieve a desired performance.

Panel 1030 shows position-velocity trajectory 1040 and position-force trajectory 1050 illustrating one embodiment of the position-force trajectory control technique disclosed herein. In this embodiment, the desired generator conditions (on which the calculation of position-force trajectories are based) are the desired apex positions of the piston assembly ($x_{TDC}^{Desired}$ and $x_{BDC}^{Desired}$). That is, the control objective is to affect the displacement of the piston assembly such that it has zero velocity at the desired TDC and BDC positions. The actual apex positions of the piston assembly ($x_{TDC}$ and $x_{BDC}$) are shown, for illustrative purposes, in panel 1030 as being different than the desired positions of the piston assembly. It will be understood, however, that the difference between the desired and actual apex positions of a piston assembly can be zero, positive, negative, or any combination thereof, and can vary depending on the specific implementation of a position-force trajectory control technique. In this embodiment, a new position-force trajectory is calculated at a fixed time interval as illustrated by the force values shown in the position-force trajectory plot 1050 (i.e., at higher velocities the force values are applied to the piston assembly over a longer distance, and at lower velocities the force values are applied to the piston assembly over a shorter distance). The control system (e.g., control system 310) may execute the force determination at a fixed time interval (e.g., 1, 5, 100 kHz). All of the force values in the position-force trajectory plot 1050 are shown, for illustrative purposes, in panel 1030 as being in the opposite direction of the motion of the piston assemblies (i.e., the LEM is always converting kinetic energy of the piston assembly into electrical energy). It will be understood, however, that each force value can be any suitable force value, including a positive force value (i.e., encouraging displacement of a piston assembly during an expansion stroke and discouraging displacement of a piston assembly during a compression stroke), a negative force value (i.e., encouraging displacement of a piston assembly during an compression stroke and discouraging displacement of a piston assembly during a expansion stroke), or a zero or neutral force value (i.e., allowing the piston assembly displacement to continue using its current momentum without applying any force).

In this embodiment, referring to panel 1030, the first position-force trajectory of a compression stroke is calculated at BDC, as illustrated by the force value $F_1$ in the position-force trajectory plot 1040. Control system 310 calculates this first force value based at least in part on the current position of the piston assembly (e.g., determined based on sensors 360 of FIG. 3) and the desired apex position of the piston assembly ($x_{TDC}^{Desired}$) and then applies this force to the piston assembly via a LEM of the generator until a new position of the piston assembly is determined and new position-force trajectory is calculated, which occurs, in this embodiment, based on a prescribed time interval. These sequential steps are repeated until the piston assembly achieves at TDC ($x_{TDC}$), at which point control system 310 then repeats the sequential steps based on a new desired apex position at BDC ($x_{BDC}^{Desired}$). The desired apex positions may remain constant across cycles, remain constant within a stroke, change across cycles, change within a stroke, or any combination thereof.

In some embodiments, the control system (e.g., control system 310) may apply the First Law of Thermodynamics (i.e., conservation of energy) to calculate a position-force trajectory. For example, for a single-piston free-piston generator, a position-force trajectory can be calculated by recognizing that, over an idealized stroke of the generator (i.e., no losses from heat transfer, gas blow-by, or friction), the work from/to the LEM, the work from/to the reaction section gas, the kinetic energy of the piston assembly, and the work from/to the driver section must sum to zero. This can be captured, for example, in equation 1, where $W_{LEM}$ is the work from/to the LEM, $W_c$ is the work from/to the reaction section gas, $KE_p$ is the kinetic energy of the piston assembly, and $W_d$ is the work from/to the driver section.

$$W_{LEM} + W_c + KE_p + W_d = 0 \qquad (1)$$

The work from/to the LEM can be calculated by integrating the motor force ($F_1$) over the change in position (x) of the piston assembly from a current position of the piston assembly ($x^c$) to a desired target position of the piston assembly ($x^d$) (e.g., a desired apex position). Since each force value is applied to the piston assembly by the LEM until a new force value is calculated and then subsequently applied, the motor force can be modeled as being constant between a current position of the piston assembly and a desired target position of the piston assembly. This simplifies the calculation of the work from/to the LEM to just the motor force multiplied by the difference between the desired target position and the current position, as shown in equation 2, where $x^d$ can be either a TDC or BDC desired target position.

$$W_{LEM} = \int_{x^c}^{x^d} F_1 dx = F_1 \int_{x^c}^{x^d} dx = F_1\left(x^d - x^c\right) \qquad (2)$$

The work from/to the reaction section gas can be calculated by integrating the pressure of reaction section gas over the change in volume of the reaction section from the reaction section volume at a current position of the piston assembly ($V_c^c$) to the reaction section volume at a desired target position of the piston assembly ($V_c^d$). In this example, for a desired TDC and BDC target positions, the work from/to the reaction section can be calculated according to equation 3, where $V_c$ is the volume of the reaction section, $p_c$ is the reaction section gas pressure as a function of the volume of the reaction section, and $V_c^d$ can be based on either a TDC or BDC desired target position.

$$W_c = -\int_{V_c^c}^{V_c^d} p_c dV_c \qquad (3)$$

The kinetic energy of the piston assembly is equal to one half the product of the mass of the piston assembly ($m_p$) and the square of the current velocity of the piston assembly ($\dot{x}^c$), as shown in equation 4.

$$KE_p = \frac{1}{2} m_p \dot{x}^{c^2} \qquad (4)$$

The work from/to the driver section depends on the type of driver section. If the driver section comprises a gas spring, then the work from/to the gas spring can be calculated similarly to the calculation of the work from/to the reaction section gas. If the driver, comprises a mechanical spring, then the work from/to the mechanical spring may be calculated based on Hooke's Law. If the driver section comprises both a gas spring and a mechanical spring, then the work from/to the driver section can be calculated using a combination of the two models. In this example, for illustrative purposes, the driver section comprises a gas spring, and the work from/to the gas spring (driver section) can be calculated using equation 5, where $W_s$ is the work from/to the gas spring, $V_s$ is the volume of the gas spring, $p_s$ is the gas spring gas pressure as a function of the volume of the gas spring, $V_s^c$ is the volume of the gas spring at a current position of the piston assembly, and $V_s^d$ is the volume of the gas spring at the desired target position of the piston assembly which can be based on either a TDC or BDC desired target position.

$$W_d = W_s = -\int_{V_s^c}^{V_s^d} p_s dV_s \qquad (5)$$

Having models for calculating the work and energy values in equation 1, a motor force value of a position-force trajectory can be calculated by substituting equations 2-5 into equation 1, as shown in equation 6a. The force applied by the LEM ($F_{LEM}$) is then the sum of $F_1$ based on the current and desired positions of the translator and a synchronization force ($F_{sync}$) that may be used to supplement, replace, or otherwise modify the value of $F_{LEM}$ (e.g., the forces of the right side of equation 6b may be weighted or otherwise modified with coefficients).

$$F_1 = \frac{\left(\int_{V_c^c}^{V_c^d} p_c dV_c + \int_{V_s^c}^{V_s^d} p_s dV_s - \frac{1}{2} m_p \dot{x}^{c^2}\right)}{\left(x^d - x^c\right)} \qquad (6a)$$

$$F_{LEM} = F_1 + F_{sync} \qquad (6b)$$

As can be seen in equation 6a, this model for calculating a position-force trajectory has a shrinking horizon as the current position of the piston assembly approaches the desired target position of the piston assembly (i.e., the denominator in equation 6a approaches zero). Practical limits can be set by or input to control system 310 on the minimum horizon (i.e., the minimum difference between the current position of the piston assembly and the desired target position of the piston assembly) to avoid division by zero, which may, in some embodiments, limit the effective authority of control system 310 near a desired target position. If the cross-sectional areas of interface between the piston assembly and the reaction section gas and the gas spring gas can be modeled as being constant, the reaction section gas work and the gas spring gas work in equation 6a can be calculated based on the change in piston assembly position from a current position to a desired target position since the volume of the respective sections is an affine function of the position of the piston assembly. This substitution is shown in equation 7, where $p_c(x)$ is the reaction section gas pressure as a function of the position of the piston assembly, $p_s(x)$ is the gas spring gas pressure as a function of the position of the piston assembly, $A_c$ is the cross-sectional area of interface between the piston assembly and the reaction section gas, and $A_s$ is the cross-sectional area of interface between the piston assembly and the gas spring gas.

$$F_1 = \frac{\left(A_c \int_{x^c}^{x^d} p_c(x)dx - A_s \int_{x^c}^{x^d} p_s(x)dx - \frac{1}{2}m_p\dot{x}^{c2}\right)}{\left(x^d - x^c\right)} \qquad (7)$$

As shown in equations 6 and 7, each position-force trajectory is calculated based at least in part on the current position of the piston assembly and the desired apex position (i.e., desired target position) of the piston assembly, without regard to a deviation from a previously determined trajectory, without regard to the time in which a new position-force trajectory will be calculated, and without regard to the time in which the piston assembly reaches the desired apex position. Repeatedly calculating a position-force trajectory using this model over a stroke of a generator cycle allows for changes in and to the operating state of the free-piston generator (rapid or slow, intended or unintended) to be accounted for in each new position-force trajectory calculation, thereby providing a control technique for a free-piston generator that is capable of rejecting disturbances in the operating state of the generator. The control technique is capable of rejecting disturbances due to, for example, reaction variability, misfires, changes in fuel energy content, changes in gas temperatures or pressures, loss of LEM phases, changes in or to the driver section spring constant, or any other suitable disturbance, or any combination thereof. Equations 6 and 7 were derived assuming that there were no energy losses within the linear generator, such as, for example, from heat transfer, gas blow-by, or friction. However, it will be understood that energy losses can be included in the position-force trajectory control technique disclosed herein. For example, heat transfer losses in a gaseous section of an generator can be modeled as a function of gas temperature (which can be modeled as a function of position or volume), heat transfer losses in a LEM can be modeled as a function of electrical current and resistance, gas blow-by losses in a gaseous section of an generator can be modeled as a function of gas pressure (which can be modeled as a function of position or volume), and friction losses can be modeled as a function of contact forces, material properties, position, and/or velocity.

Solving equation 6 requires integration of pressure over a change in volume for, in this example, both the reaction section gas and gas spring gas. These integrals can be computed using a numerically iterative solution (e.g., an ordinary differential equation solver) based on thermodynamic property models, heat transfer models, gas blow-by models, friction models, or any other suitable model, or any combination thereof. These integrals can also be computed using a closed-form solution based on thermodynamic models that may incorporate effects from heat transfer, gas blow-by, friction, and other losses in the system. Using a closed-form solution to calculate a position-force trajectory saves computation time compared to a numerically iterative solution. This can allow the control system 310 to calculate a new position-force trajectory in shorter time intervals (i.e., at a faster frequency), which can better account for disturbances in the operating state of the generator. For example, the compression and expansion of the gases in the reaction section and gas spring can be modeled as being reversible. The reversible work for the compression and expansion of a gas can be calculated using equation 8, where $p_1$ is the pressure of the gas at state 1, $V_1$ is the volume of the gas at state 1, $V_2$ is the volume of the gas at state 2, and k is the ratio of specific heats.

$$W_{rev,1\to2} = \int_{V_1}^{V_2} pdV = \frac{p_1V_1}{k-1}\left(\left(\frac{V_1}{V_2}\right)^{k-1} - 1\right) \qquad (8)$$

Modeling the compression and expansion of the reaction section gas and gas spring gas as being isentropic, can yield a closed-form solution for calculating a position-force trajectory, as shown in equation 9, where $k_c$ is the ratio of specific heats for the reaction section gas and $k_s$ is the ratio of specific heats for the gas spring gas.

$$F_1 = \frac{\left(\frac{p_c^c V_c^c}{k_c - 1}\left(\left(\frac{V_c^c}{V_c^d}\right)^{k_c-1} - 1\right) + \frac{p_s^c V_s^c}{k_s - 1}\left(\left(\frac{V_s^c}{V_s^d}\right)^{k_s-1} - 1\right) - \frac{1}{2}m_p\dot{x}^{c2}\right)}{\left(x^d - x^c\right)} \qquad (9)$$

As shown in equation 9, different ratios of specific heats can be used for the reaction section gas and the gas spring gas (e.g., to account for differences in composition). Different ratios of specific heats can also be used for a compression stroke and an expansion stroke (e.g., to account for the changes in composition of the reaction section gas), for specific position intervals within a stroke (e.g., to account for changes during generator breathing while ports are exposed), for each calculation of a position-force trajectory (e.g., to account for changes in gas temperature), for any other suitable purpose or reason, or any combination thereof. A closed-form solution can also be derived by modeling the gas compression and expansion as being a polytropic process, as shown in equation 10, where $n_c$ is the polytropic exponent for the reaction section gas and $n_s$ is the polytropic exponent for the gas spring gas.

$$F_1 = \frac{\left(\frac{p_c^c V_c^c}{n_c - 1}\left(\left(\frac{V_c^c}{V_c^d}\right)^{n_c-1} - 1\right) + \frac{p_s^c V_s^c}{n_s - 1}\left(\left(\frac{V_s^c}{V_s^d}\right)^{n_s-1} - 1\right) - \frac{1}{2}m_p\dot{x}^{c2}\right)}{\left(x^d - x^c\right)} \qquad (10)$$

Modeling the compression and expansion of gases as being a polytropic process allows for the effects of heat transfer, gas blow-by, friction, other losses, or any combination thereof, to be accounted for while maintaining a closed-form solution for calculating a position-force trajectory. The polytropic exponents for the reaction section gas and the gas spring gas can be based on modeled or empirically determined generator performance data or information. Different polytropic exponents can be used for a compression stroke and an expansion stroke, for specific position intervals within a stroke, for each calculation of a position-force trajectory, for any other suitable purpose or reason, or for any combination thereof.

In order for control system 310 to solve equations 9 or 10, the pressure of the gases in the reaction section and gas spring must be measured or estimated, or both, at each current position of the piston assembly. The pressure of the gases at a current position of the piston assembly can be measured using any suitable sensor(s) 360 such as piezo-electric pressure transducers, strain-based pressure transducers, gas ionization sensors, any other suitable pressure sensor, or any combination thereof. The pressure of the gases at a current position of the piston assembly can also be estimated. In general, relying on estimates of pressure (as opposed to measurements of pressure) can save cost and lead to higher reliability generator operation because it avoids the need for expensive and often unreliable pressure sensors. For example, the compression and expansion of the gases can be modeled as being isentropic or polytropic using equations 11 or 12, respectively, where $\hat{p}^c$ is the estimated gas pressure at a current position of the piston assembly, $p^p$ is the measured or estimated gas pressure at a previously determined position of the piston assembly, and $V^p$ is the measured or estimated volume of the gas at the same previously determined position of the piston assembly. Equations 11 and 12 are applicable to estimating the current gas pressures in any section of a generator, including a reaction section and driver section.

$$\hat{p}^c = p^p \left(\frac{V^p}{V^c}\right)^k \qquad (11)$$

$$\hat{p}^c = p^p \left(\frac{V^p}{V^c}\right)^n \qquad (12)$$

In another example, for a single-piston free-piston generator with a gas spring driver section, a force balance model can be applied to the translator to estimate a current gas pressure of the reaction section based on a measured or estimated current gas pressure of the gas spring, a previously applied/calculated motor force value, the mass of the piston assembly, and a current measured or estimated acceleration of the piston assembly. This force balance model is shown in equation 13, where $\hat{p}_c^c$ is the estimated gas pressure in the reaction section at the current position of the piston assembly, $\ddot{x}^c$ is a current acceleration of the piston assembly, $F_{LEM}^p$ is a previously applied/calculated motor force, and $p_s^c$ is the measured or estimated current gas pressure in the gas spring.

$$\hat{p}_c^c = \frac{(m_p \ddot{x}^c - F_{LEM}^p + p_s^c A_s)}{A_c} \qquad (13)$$

A force balance model may also be used to estimate a previous gas pressure of the reaction section based on previously measured or estimated other values, which can then be used to calculate a current gas pressure of the reaction section through, for example, equations 11 or 12. This force balance model is equation 14, where $\hat{p}_c^c$ is the estimated gas pressure of a reaction section at a previous position of the piston assembly, $\ddot{x}^p$ is the previously determined acceleration of the piston assembly, and $p_s^p$ is the previously determined gas pressure of the gas spring.

$$\hat{p}_c^p = \frac{(m_p \ddot{x}^p - F_{LEM}^p + p_s^p A_s)}{A_c} \qquad (14)$$

It will be understood that force balance models (similar to those used to derive equations 13 and 14) can also be used to estimate the current or previous gas pressures in other sections of a generator, such as, for example, a driver section.

In some embodiments, control system 310 may estimate a current gas pressure in a section of a free-piston generator by integrating energy balances over a stroke of a generator cycle from a fixed previous position to a current position of a free-piston assembly, where a fixed previous position may be, for example, an apex position, a port opening or closing position, a reaction event, any other suitable position, or any combination thereof. For example, for a single-piston free-piston generator with a gas spring driver section, a current gas pressure can be estimated by using equation 15, which models the energy balance of a free-piston assembly from a fixed previous position to a current position, where $W_{LEM}^{o \to c}$ is the work from/to the LEM from the fixed previous position to the current position, $W_c^{o \to c}$ is the work from/to the reaction section gas from the fixed previous position to the current position, and $W_s^{o \to c}$ is the work from/to the gas spring section gas from the fixed previous position to the current position.

$$W_c^{o \to c} + W_s^{o \to c} + W_{LEM}^{o \to c} + KE_p = 0 \qquad (15)$$

The compression and expansion of the gases in the reaction section and gas spring section can be modeled as being reversible and/or polytropic to yield closed-form solutions for the work from/to the respective sections. Modeling the compression and expansion of the gases in the reaction section and gas spring section as being polytropic, for this example, the work from/to the reaction section and from/to the gas spring section from a fixed previous position and current position can be calculated using equations 16 and 17, respectively, where $p_c^o$ is the measured or estimated reaction section gas pressure at the fixed previous position, $V_c^o$ is the reaction section volume at the fixed previous position, $p_s^o$ is the measured or estimated gas spring section gas pressure at the fixed previous position, and $V_s^o$ is the gas spring section volume at the fixed previous position.

$$W_c^{o \to c} = \frac{p_c^o V_c^o}{n_c - 1}\left(\left(\frac{V_c^o}{V_c^c}\right)^{n_c-1} - 1\right) = -\frac{p_c^c V_c^c}{n_c - 1}\left(\left(\frac{V_c^c}{V_c^o}\right)^{n_c-1} - 1\right) \qquad (16)$$

$$W_s^{o \to c} = \frac{p_s^o V_s^o}{n_s - 1}\left(\left(\frac{V_s^o}{V_s^c}\right)^{n_s-1} - 1\right) = -\frac{p_s^c V_s^c}{n_s - 1}\left(\left(\frac{V_s^c}{V_s^o}\right)^{n_s-1} - 1\right) \qquad (17)$$

The work from/to the LEM can be calculated using equation 18, which updates the amount of work from/to the LEM with each calculation step, where $x^{ip}$ is the position of the piston assembly at the immediately preceding calculation step, $F_{LEM}^{ip}$ is the LEM force determined at the immediately preceding calculation step (and then applied to the piston assembly from its position at the immediately preceding calculation step to its current position), and $W_{LEM}^{o \to ip}$ the amount of work from/to the LEM from the fixed previous position to the position of the piston assembly at the immediately preceding calculation step.

$$W_{LEM}^{o \to c} = F_{LEM}^{ip}\left(x^c - x^{ip}\right) + W_{LEM}^{o \to ip} \qquad (18)$$

The kinetic energy of the piston assembly at the current position can calculated using equation 3. Equations 16-18 and 3 can be substituted into equation 15 to estimate a current gas pressure in the reaction section or gas spring section using a closed-form solution. For example, equation 19 shows a closed-form solution for estimating a current pressure of the reaction section gas.

$$\hat{p}_c^c = \frac{\frac{p_s^o V_s^o}{n_s - 1}\left(\left(\frac{V_s^o}{V_c^c}\right)^{n_s - 1} - 1\right) + \left(F_{LEM}^{ip}\left(x^c - x^{ip}\right) + W_{LEM}^{o \to ip}\right) + \frac{1}{2}m_p\dot{x}^{c2}}{\frac{V_c^c}{n_c - 1}\left(\left(\frac{V_c^c}{V_c^o}\right)^{n_c - 1} - 1\right)} \qquad (19)$$

Equations 6, 7, 9, and 10, or any other suitable First Law-based analysis used to derive similar equations (e.g., to include losses within the generator), may also be used, separately or in combination, to estimate a current or previous gas pressure in a section of a free-piston generator using similar techniques as those used to derive equations 11-14 and 19 (i.e., through the use of current and previously determined pressures, forces, volumes, positions, velocities, and accelerations). Additionally, equations 11-14 and 19 may be used in combination with each other and/or with other suitable estimation models to estimate a current or previous gas pressure in a section a free-piston generator using similar techniques to those used to derive equations 11-14 and 19 (i.e., through the use of current and previously determined pressures, forces, volumes, positions, velocities, and accelerations).

Using previously calculated values (e.g., force, acceleration, pressure, velocity, position) to estimate a current value (e.g., a current gas pressure) may require the use of a smoothing filter such as an infinite impulse response (IIR) filter or finite impulse response (FIR) filter with suitable coefficients to the values of interest, or a dynamic estimator such as a Luenberger observer or Kalman filter. The pressure of gases at a current or previous position of the piston assembly can be estimated using thermodynamic relation models (e.g., equations 11 or 12), force balance models (e.g., equations 13 or 14), or First Law analysis (e.g., equations 6, 7, 9, 10, or 19), or any combination thereof. For example, the pressure of the gases at a current or previous position of the piston assembly can be estimated using two models, with one of the models being used as a primary estimate and the other model being used to improve the primary estimate using an estimation technique, such as an Kalman filter, Luenberger observer, or model-predictive estimation. In another example, the pressure of the gases at a current or previous position of the piston assembly can be estimated based on a minimization of error between the estimates from any two models. This minimization can weigh the two models and include other costs such as, for example, acceleration estimates given several position measurements, deviation from previous pressure measurements or estimates, deviation from pressure measurements or estimates from prior cycles or strokes, computation time, information on noise or disturbance statistics, any other suitable cost, or any combination thereof. In some embodiments, estimations of the gas pressures at a current or previous position of the piston assembly can be improved upon by measurements of pressure from any otherwise unsuitable sensor, which may provide inadequate, noisy, or slow measurements.

When the absolute velocity of a piston assembly is low and its absolute acceleration is high, the efficiency of a LEM may be low and the ability of a LEM to affect the displacement of the piston assembly may be limited. In order to avoid a LEM applying forces to the piston assembly when its efficiency is low and control authority is limited, in some embodiments, control system 310 may reduce or eliminate the magnitude of force applied to a piston assembly based on specified operating parameters of a free-piston generator. Specified operating parameters may include position, velocity, or acceleration of a piston assembly, temperature of the stator or translator of the LEM, gas pressure in a section of the generator, any other suitable parameter, or any combination thereof. For example, control system 310 may cut-off the ability of the LEM to apply forces to a piston assembly based on the position of the piston assembly as shown in panel 1060, which shows position-velocity trajectory 1070 and position-force trajectory 1080. In this example, control system 310 calculates a position-force trajectory in accordance with the present disclosure, but when the position of the piston assembly is outside of the cut-off positions, control system 310 determines to not apply the force values calculated in the position-force trajectory calculation step. In some embodiments, control system 310 may determine to apply a different amount of force to a piston assembly than the force values calculated in a position-force trajectory calculation step based on specified operating conditions of a free-piston generator. For example, control system 310 may apply a force-reduction function to the force values calculated in a position-force trajectory calculation step based on a position of the piston assembly (e.g., outside of the cut-off positions) in order to avoid abrupt changes in the operating state of the generator. In some embodiments, control system 310 may determine to both (i) not calculate a position-force trajectory and (ii) not apply a force to a piston assembly based on specified operating conditions of a free-piston generator.

While the various models for calculating a position-force trajectory and estimating gas pressure (i.e., equations 1-19) have been directed towards a single-piston free-piston generator, it will be understood that the same models can be extended and applied to free-piston generators with multiple piston assemblies, such as, but not limited to, opposed-piston free-piston generators with respective driver sections, respective LEMs, and a shared reaction section (e.g., as illustrated in FIGS. 1-2). For example, the same First Law analysis used to derive equation 1 can be applied to each piston assembly of an opposed-piston free-piston generator with respective driver sections, respective LEMs, and a shared reaction section. This yields energy balance equations 20a and 20b, where $W_{LEM,1}$ and $W_{LEM,2}$ are the work from/to the two LEMs, $W_c$ is the work from/to the reaction section gas, $KE_{p,1}$ and $KE_{p,2}$ are the kinetic energy of the two piston assemblies, and $W_{d,1}$ and $W_{d,2}$ are the work from/to the two driver sections. Equations 20a and 20b can be used by control system 310 to calculate a position-force trajectory for each respective piston assembly using the same or similar models as those used to derive equations 6, 7, 9, and 10.

$$W_{LEM,1} + W_c + KE_{p,1} + W_{d,1} = 0 \qquad (20a)$$

$$W_{LEM,2} + W_c + KE_{p,2} + W_{d,2} = 0 \qquad (20b)$$

In similar manner in which equation 1 was extended to a free-piston generator with multiple piston assemblies (e.g., equations 20a and 20b), it will be readily apparent that the same force balance models used to derive equations 13 and 14, and the same First Law analysis used to derive equation 15 can be extended to free-piston generators with multiple piston assemblies for estimating gas pressure in a section of the generator.

A consideration that arises in the control of free-piston generators with opposed piston assemblies, is the synchronization of the piston assemblies. In some opposed-piston free-piston generators, it can be desired that the apices (at both TDC and BDC) of the two piston assemblies be at least substantially synchronized in order to maintain system stability. In other opposed-piston free-piston generators, some level of non-synchronization can be desired for generator performance purposes, such as, for example, generator breathing, gas exchange, or any other suitable generator operating condition. In some embodiments of an opposed-piston free-piston generator, control system 310 may regulate a difference between the positions of the respective piston assembly. As used herein, the term "regulate" refers to controlling to a reference, such as, for example, zero. Control system 310 may employ any suitable control technique for regulation, such as proportional-integral-derivative (PID) control, optimal control, robust control, linear-quadratic regulator control, model-predictive control, adaptive control, any other suitable technique, or any combination thereof. In some embodiments, control system 310 may use PID control to regulate and synchronize the positions of piston assemblies. For example, control system 310 may use PID control to determine control inputs (e.g., forces values to be applied to the piston assemblies by respective LEMs) to regulate a difference in position between the piston assemblies relative to their center of motion. Opposite forces may be added to each piston assembly to synchronize each substantially equally and minimize the disturbance on apex positions. This may be done continuously to substantially balance net forces and, therefore, maintain sufficient synchronization. In some embodiments, control system 310 may use a specified Poincare map at the zero-velocity positions of the piston assemblies (i.e., at the respective apices). For example, control system 310 can split a stroke into two halves and apply additional motor force in one direction during the first half of the stroke and then apply additional motor force in the opposite direction during the second half of the stroke. Control system 310 can determine prior to an expansion stroke that a first piston assembly is going to be late to BDC (e.g., using any suitable expected phasing of the two piston assemblies, based on timing of a previous stroke, based on any other suitable technique, or any combination thereof), and apply additional motor force to this first piston assembly during the first half of the expansion stroke in the direction of motion (i.e., encouraging displacement) and then apply additional motor force to this first piston assembly during the second half of the expansion stroke in the opposite direction of motion (i.e., discouraging displacement). Conversely for the second piston assembly, control system 310 can apply additional motor force to this second piston assembly in the opposite direction of motion during the first half of the expansion stroke (i.e., discouraging displacement) and then apply additional motor force to this second piston assembly in the direction of motion during the second half of the expansion stroke (i.e., encouraging displacement). In some embodiments, control system 310 may determine synchronization forces based on a desired timing of a desired generator performance. For example, control system 310 may determine synchronization forces to be applied to one or both piston assemblies such that the apices of the respective piston assemblies occur within a sufficiently small time difference.

In some embodiments, control system 310 may use a repetitive adaptive control technique. Repetitive adaptive control can be advantageous when the operating state, condition, performance, and/or parameters of a free-piston generator are relatively steady, and the cycle-to-cycle variation is limited. In some embodiments, control system 310 may use a repetitive adaptive control technique that determines a position-force trajectory at each iteration for a current generator cycle based on the position-force trajectory from a previous generator cycle. In some embodiments, control system 310 may use a repetitive adaptive control technique that drives force values toward a known and desirable propagation path (e.g., to enforce a smoother or more continuous force profile). For example, control system 310 may first approximate, based on information from a previous cycle (e.g., force values, generator performance, etc.), a position-force trajectory as a series of discrete force values over a generator cycle. Control system 310 may then cause the discrete force values to be applied to the piston assembly over each stroke of the generator cycle, and at the end of each cycle, control system 310 may adjust the discrete force values based on generator operating characteristics, measurements, performance, and/or conditions. Control system 310 may alter all or some of the discrete force values prior to a subsequent cycle if, for example, a piston assembly does not sufficiently achieve a desired target position for a given stroke. For example, if a piston apexes short of the desired target TDC on a previous cycle, control system 310 may, on the subsequent cycle, reduce the magnitude of some or all of the discrete force values. In embodiments with opposed-piston free-piston generators with a shared (or common) reaction section, control system 310 may alter the discrete force values in one or more portions of a stroke for one or both of the piston assemblies, dependently or independently, during the subsequent cycle. For example, if on a current generator cycle an exhaust piston assembly reached its apex at TDC after the intake piston assembly reached its apex at TDC, control system 310 can, on the subsequent cycle, adjust the discrete force values applied to the exhaust piston assembly and not adjust the discrete force values applied to the intake piston assembly in order to achieve sufficient synchronization at TDC. This can be achieved by, for example, control system 310 reducing the magnitude of the discrete force values applied to the exhaust piston assembly over the first half of the stroke, thereby allowing the midpoint velocity of the piston to increase, and then increasing the magnitude of the discrete force values applied to the exhaust piston assembly over the second half of the stroke, thereby achieving sufficient synchronization at TDC. In some embodiments, control system 310 may use a repetitive adaptive control technique that is based on calculating a deviation from a previously determined trajectory (position-force, position-velocity, time-position, or any suitable trajectory).

In some embodiments, control system 310 may use a hybrid control technique that is capable of switching between multiple control techniques. A hybrid control technique can be advantageous for controlling a free-piston generator across a wide range of operating conditions, controlling a free-piston generator when sufficiently fast and large disturbances in generator operation may occur (e.g., reaction misfire, mechanical failures, gas quality changes, or any other suitable changes), and controlling a free-piston generator under steady or stable operating conditions (e.g., at steady and continuous power output). For example, control system 310 can employ a position-force trajectory control technique during generator start up and then switch to a repetitive adaptive control technique when the generator operation becomes sufficiently stable or steady. Control system 310 can then switch back to a position-force trajectory control technique if a sufficiently large disturbance is detected or if a new generator operating condition is desired (e.g., more or less power output, generator shut down).

Figure 11:
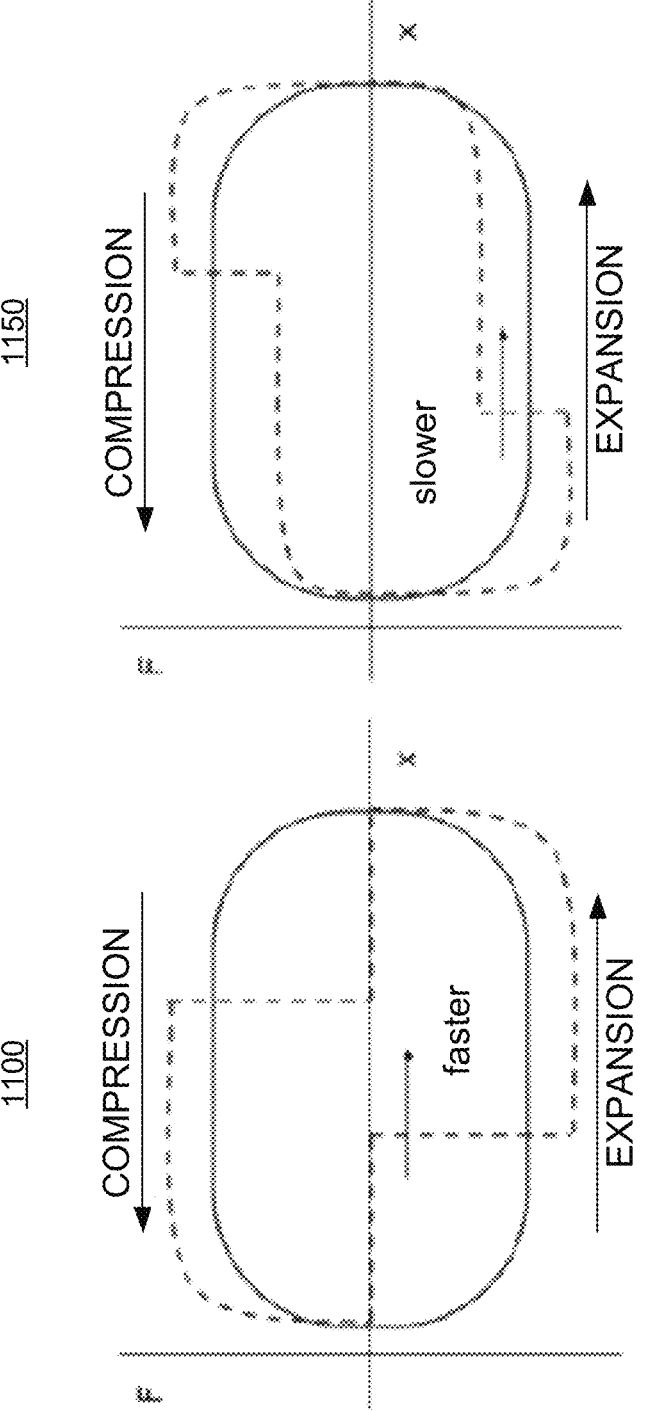
FIG. 11 shows two plots of illustrative LEM force versus position for a translator illustrating the effect of force profile on frequency, in accordance with some embodiments of the present disclosure.

FIG. 11 shows two plots 1100 and 1150 of illustrative LEM force versus position for a translator illustrating the effect of force profile on frequency, in accordance with some embodiments of the present disclosure. The force "F" is the force applied to translators by the LEM (e.g., phases of a stator thereof). The position "x" is the position of the translator of the LEM (e.g., "x=0" is the power-cylinder with both pistons at the center). Positive force is directed axially outwards from the center, pushing the translators away from the center. Negative force is directed axially inwards towards the center, pushing the translators toward the center of the power-cylinder. Panels 1100 and 1150 show baseline position-force profiles (e.g., a position-force trajectory over a stroke or cycle) as solid traces, and sync force profiles (e.g., a position-force trajectory over a stroke or cycle) over the expansion stroke as dash-dot traces.

Referencing panel 1100, the sync position-force profile is one that would provide a faster frequency for the corresponding translator(s) of a particular core. It will be understood that panel 1100 is illustrative, and there are other sync profiles that could also be used to maintain the same apex points with different frequencies, in accordance with the present disclosure. For example, the profiles of FIGS. 8-10 may be modified for synchronizing or otherwise managing a phase offset of cores. For example, the profiles of FIGS. 8-10 may be modified to exhibit zero force for part of the expansion (and compression) strokes, only "engaging" the controller along the stroke (e.g., midway through the stroke) to allow it to apply a suitable force to achieve a desired apex position (e.g., TDC or BDC). Thus, increasing the frequency may be achievable by modifying $F_{LEM}$, $F_{sync}$, or otherwise modifying the force applied to a translator to effect a change in frequency (e.g., as applied to equations 1-20).

Referencing panel 1150, reducing the cycle frequency (e.g., slowing the translators of a core down) may involve the control system applying a higher force than the standard apex algorithm (e.g., $F_{sync}$ has the same sign as $F_1$ and is additive to $F_1$ of equations 6a and 6b) for part of the stroke (e.g., the first half of the stroke) then again "engaging" the standard algorithm to let it correct the force to achieve the desired apex (e.g., or the remainder of the stroke). In some embodiments, the control system may apply a continuous control scheme in which a multiplier is applied to the force $F_1$ for a portion of the stroke (e.g., the first half of the stroke). For example, if the cores are not being synchronized or otherwise no adjustment to the phase offset is needed, then the control system would apply no multiplier (e.g., a multiplier of one). To illustrate, the control system may apply a multiplier less than unity to achieve an increase in frequency, and a multiplier greater than unity to achieve a decrease in frequency. In some embodiments, the control system may implement a feedback control technique, using the multiplier to adjust the force applied to the translators (e.g., $F_{LEM}$), with illustrative authority limits on the multiplier of zero and infinity, zero and an integer greater than one, zero and a number greater than one, two integers of which one is less than unity and one is greater than unity, or any other suitable range (e.g., wherein the force may be saturated by another value based on the capability of the LEM).

Equations 21a-21$^d$ illustrate some examples of force determinations the control system may apply.

$$F_{LEM} = aF_1 + bF_{sync} \qquad (21a)$$

$$F_{LEM} = aF_1 \qquad (21b)$$

-continued
$$F_{LEM} = \{F_1, F', F''\} \qquad (21c)$$

$$F_{LEM} = F'_{LEM} \qquad (21d)$$

Referencing equation 21a, the control system may apply equation 6b, but with coefficients that weight the force determined based on translator work ($F_1$) and a synchronizing force ($F_{sync}$). The coefficients "a" and "b" may be limited to any suitable range, restricted to a value (e.g., "a" may be fixed at unity) or discrete set of values selected based on a state of the system (e.g., synchronizing or non-synchronizing) based on reference information, determined based on a model or equation (e.g., based on operating parameters, reference values, and/or measured values), determined based on any other suitable criterion, or any combination thereof. Referencing equation 21b, the control system may apply a multiplier that weights a determined desired motor force (e.g., F1, the force determined based on translator work). For example, "a" may range from less than one to greater than one, depending on whether the frequency of the translators of a core are to be increased or decreased. Referencing equation 21$^c$, the control system may select from among more than one force determination technique (e.g., depending on whether the system is synchronizing or non-synchronizing). For example, the control system may select from among a set of equations, a set of models, a set of parameter values, a set of reference information (e.g., reference values), or otherwise apply different force determinations based on the selection. Referencing equation 21d, the control system may modify a force determination when synchronizing or non-synchronizing, based on any suitable criterion.

Several other methods of control have been conceived for future implementation. For example, the BDC modification of both cores may be accomplished based on coordination instructions rather than a leader-follower to decrease the authority requirements of a follower core. In some embodiments, the cores could be modified symmetrically or in different frequency bands. In some embodiments, an algorithm for generating synchronizing instructions could be centralized and capable of commanding the BDC modification to both cores, or distributed such that each core calculates its own BDC relying on a common algorithm to achieve stability. In some embodiments, the algorithm could be implemented as a component of a larger-scale algorithm for determining BDC position to meet multiple criteria, such as cylinder breathing and intake-exhaust asymmetry balancing.

In another example, the power of one or both cores may be modified to correct frequency and slowly zero-out the BDC offset. This approach matches core frequencies while not incurring a penalty in asymmetry from the expansion vs compression power production. This coordination of controlling power and BDC could be a family of controllers. Generally, power can control frequency but not phase, whereas BDC has an immediate effect, which makes it capable of controlling phase. To reduce the power range, several options exist. For example some non-limiting examples include making the cores very similar to each other and match the power on each, matching cores after checking their natural frequency (e.g., if a manufacturing facility makes 20 cores, pair up the most similar ones), introducing other actuators to fundamentally adjust the frequency of a core (e.g., provide a valve at the inlet to the boost-box to change the air-spring effective stiffness by adjusting k in the standard k×dx spring model). In some embodiments, a mechanism may be provided to modify the volume of the boost box to change the air-spring effective stiffness (e.g., adjust dx or dV in the standard k×dx spring model).

Adjust the force profile while maintaining BDC and power. For example, FIG. 5 illustrates a position-force trajectory of translators of two cores, in accordance with some embodiments of the present disclosure. The forces on translators of each core applied by respective stators are modified to maintain the respective BDC positions, power output, or both of the cores.

Figure 12:
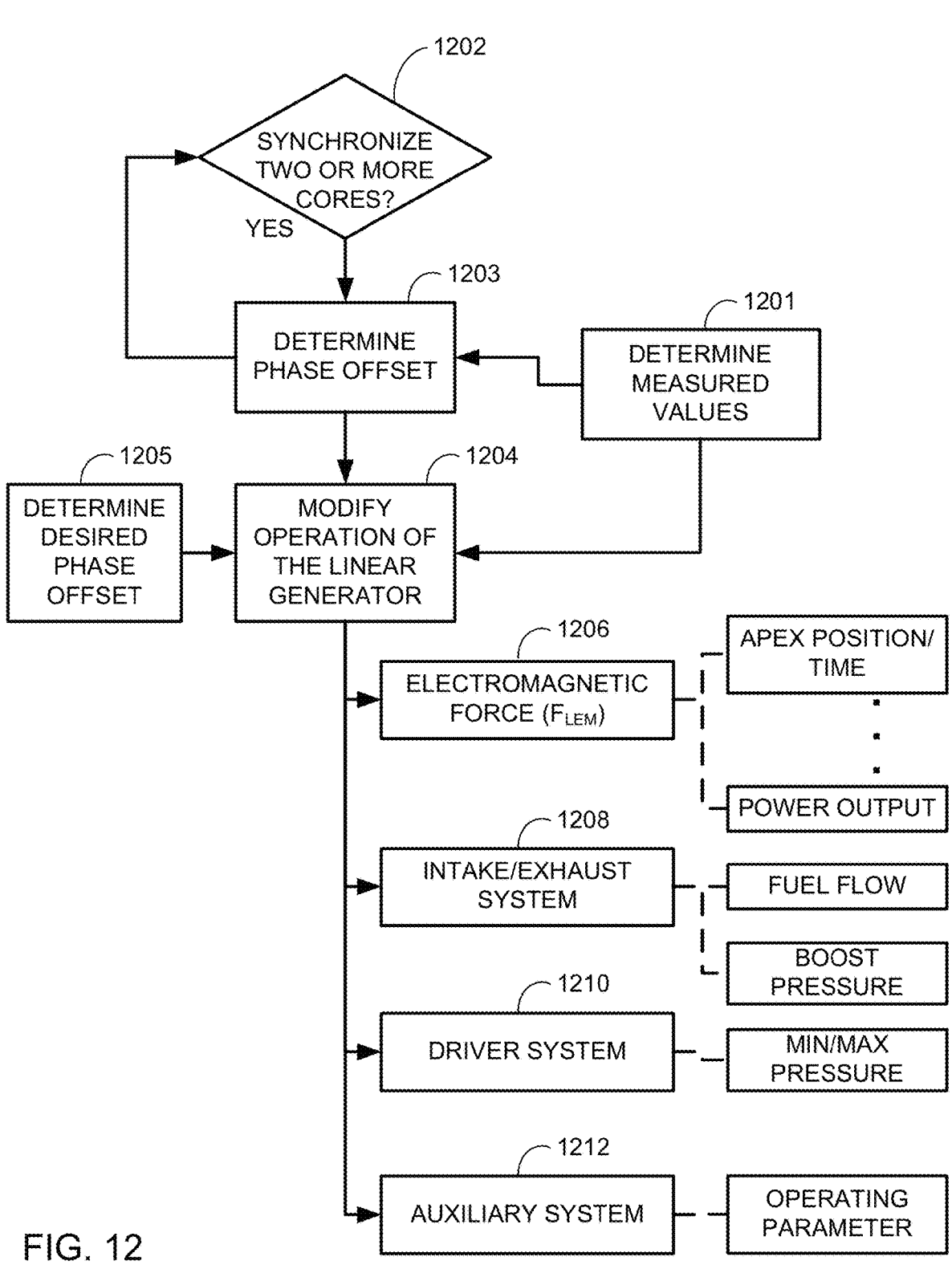
FIG. 12 illustrates a process for controlling a phase difference between cores, in accordance with some embodiments of the present disclosure.

FIG. 12 illustrates process 1200 for controlling a phase difference between cores, in accordance with some embodiments of the present disclosure.

At step 1202, the system determines whether to synchronize two or more cores. This determination may be made automatically by the control system, for example based on measured values, or it may be manually set, that is by an external signal or a user input. At step 1201, the system receives or otherwise determines one or more measured values associated with the linear generator.

At step 1203, the system determines a phase offset between a first core and a second core. In some embodiments, the system determines multiple phase offsets (e.g., N−1 values between a reference core and N−1 other cores, in a N-core system, where N is a positive integer greater than one).

At step 1204, the system modifies operation of the linear generator based on a comparison of the determined phase offset of step 1203 and the desired phase offset of step 1205, where the system receives or otherwise determines a desired phase offset between a first core and a second core. In some embodiments, the system determines multiple desired phase offsets (e.g., N−1 values between a reference core and N−1 other cores, in an N-core system, where N is a positive integer greater than one). The system may adjust any suitable operating aspect of the linear generator, or a core thereof, as illustrated by steps 1206-1212.

At step 1206, the system modifies an electromagnetic force applied by a stator on a corresponding translator. In some embodiments, each core includes two stators and two translators (e.g., has two LEMs), and accordingly the system determines two force values for the respective stators to apply.

At step 1208, the system modifies an aspect of operation of an intake system, an exhaust system, or a combination thereof. For example, the intake system may include a fuel system, an intake air system (e.g., including a boost blower), an intercooler, any other suitable aspect of providing air and fuel to the power cylinder, or any combination thereof. In a further example, the exhaust system may include a muffler, tuned pipe, back-pressure valve, ducting, any other suitable components for controlling the flow or properties of exhaust gas, or any combination thereof.

At step 1210, the system modifies an aspect of operation of a driver system. In some embodiments, each core includes two driver sections (e.g., two gas springs), and accordingly the system controls operation of each driver section of the core.

At step 1212, the system modifies an aspect of operation of an auxiliary system.

In an illustrative example, the system determines a phase offset at step 1203 and determines a desired phase offset at step 1205. The phase offset may be differences in position, times that positions are achieved, differences in position-time trajectories, differences in velocity-time trajectories, differences in force-time trajectories, differences in power output as a function of time, differences in pressure or flow features as a function of time, differences in any other operating parameter between two or more cores, or a combination thereof. The system modifies operation of the linear generators based on the determined phase offset and the desired phase offset. Modifying operations may include adjusting an electromagnetic force applied by a stator to a translator (e.g., by controlling current using a power electronics system). The system may modify an apex position, a time associated with an apex position, a position-time trajectory, a frequency, a power output, any other operating parameter of the either or both cores, and any combination thereof.

Figure 13:
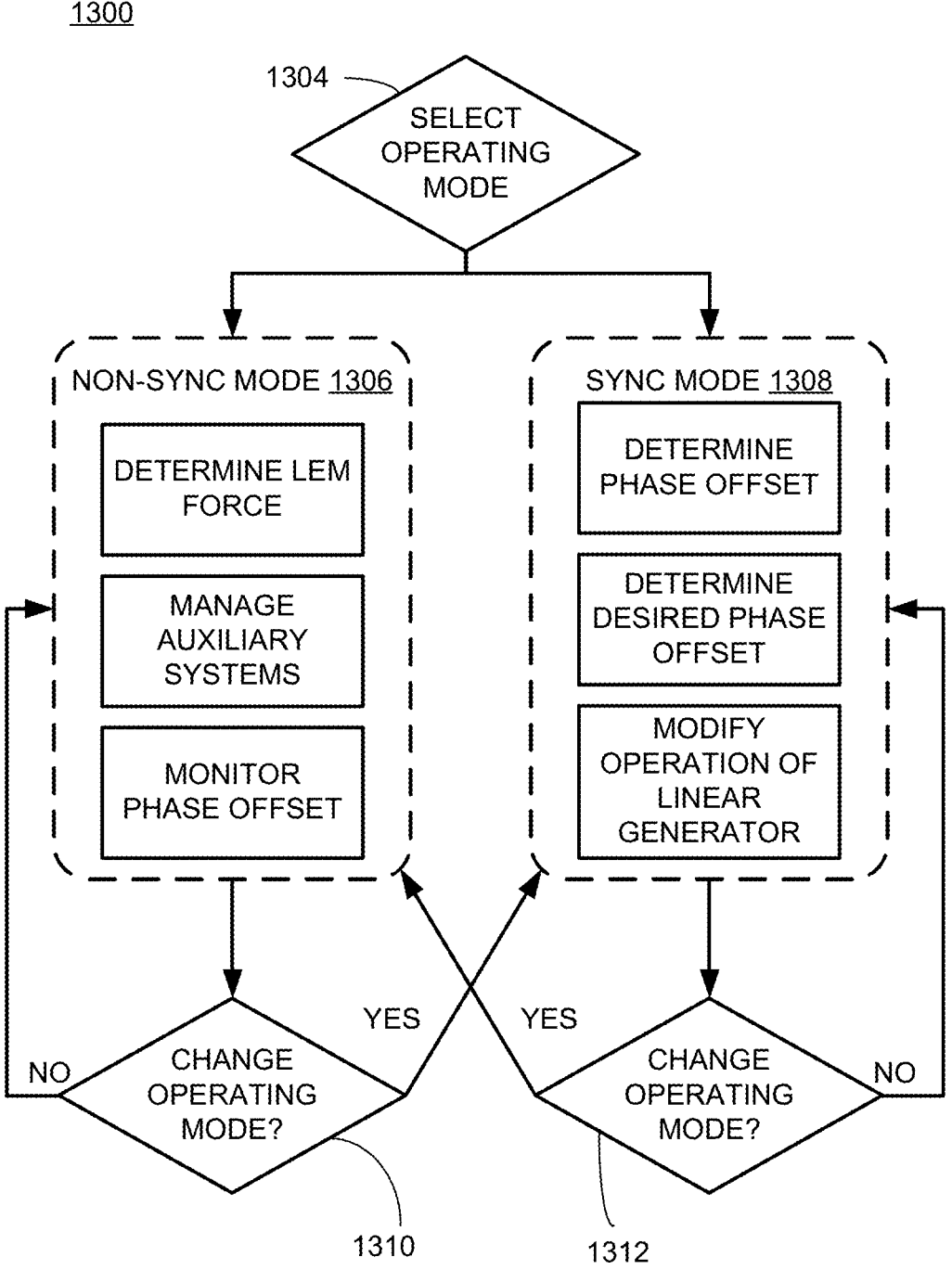
FIG. 13 illustrates a process for managing and operating linear generator systems, in accordance with some embodiments of the present disclosure.

FIG. 13 illustrates process 1300 for managing and operating linear generator systems, in accordance with some embodiments of the present disclosure. Process 1300 comprises illustrative steps for a control system (e.g., any or all of the control systems and components thereof as shown in FIGS. 1, 2, 3, 7, and 12) to control the displacement of the one or more piston assemblies along a propagation path in a linear generator in accordance with some embodiments of the present disclosure.

At step 1304, one of non-sync operation mode 1306 or sync operation mode 1308 is selected either automatically by the control system, for example based on measured values, or it may be manually set, that is by an external signal or a user input. If, at step 1304, non-sync mode 1306 is selected, a determination is made (e.g., based on at least one of a determined LEM force, auxiliary systems status, manual input, or phase offset) whether to change the operating mode at step 1310. If it is determined step 1310 to change the operation mode (e.g., YES at step 1310), the control system changes the operating mode to sync operation mode 1308. If it is determined step 1310 that a change in operation mode is not needed (e.g., NO at step 1310), the control system continues to monitor various parameters (e.g., LEM force, auxiliary systems statuses, and/or phase offsets) to determine if a future change in operating mode is warranted at step 1310.

If, at step 1304, sync mode 1308 is selected, a determination is made (e.g., based on at least one of a determined phase offset, a desired phase offset, and/or an instruction to modify the operation of a linear generator) at step 1312 whether to change the operating mode. If it is determined at step 1312 to change the operation mode (e.g., YES at step 1312), the control system changes the operating mode to non-sync operation mode 1306. If it is determined at step 1312 that a change in operation mode is not needed (e.g., NO at step 1312), the control system continues to monitor various parameters (e.g., a determined phase offset, a desired phase offset, and/or whether an instruction has been received to modify the operation of a linear generator) to determine if a future change in operating mode is warranted at step 1312.

In some embodiments, steps 1304, 1310, and/or 1312 are repeated until a control system sends a command to cease. The command to cease may be sent for any suitable reason, including, for example, the control system having determined to switch to a different control technique, to turn off the generator, that a mechanical or electronic safety switch tripped, for any other suitable reason, or for any combination thereof. The steps 1304, 1310, and/or 1312 can repeat based on the activation of a particular trigger or repeat throughout a generator stroke or cycle. For example, steps 1304, 1310, and/or 1312 can repeat in response to a particular event, at a particular threshold crossing, any other suitable trigger, or any combination thereof. In another example, steps 1304, 1310, and/or 1312 can repeat at particular time intervals (e.g., 1 kHz, 10 kHz, etc.) or at particular discrete position intervals (e.g., every 1 millimeter, every 1 micron, etc.).

Suitable sensors for determining attributes corresponding to, non-sync mode 1306 and/or sync mode 1308 may monitor position or other attributes of the one or more piston assemblies through the use of magnetic encoders, optical encoders, optical grating encoders, laser-based encoders, pressure sensors, any other suitable sensors for determining position, or any combination thereof. The current position can be any position between BDC and TDC, inclusive. While, in the case of a linear free-piston generator, a current position of the one or more piston assemblies can be represented as a single dimension along a single axis of propagation per piston assembly, it will be understood that the teachings of the present disclosure can be applied to a free-piston generator in which a piston assembly is able to move in more than one dimension and in which a current position can be represented multi-dimensionally.

After selecting sync mode 1308 at step 1304, the control system may send one or more commands to a free-piston generator and/or its auxiliaries to affect the displacement of the one or more piston assemblies. The displacement may be affected by applying forces to the one or more piston assemblies by, for example, exerting an electromagnetic force onto the one or more piston assemblies via a LEM. The following discussion is directed toward applying the forces through a LEM, but it will be understood that the application of force to the one or more piston assemblies could be applied through other techniques, such as, for example, by adjusting properties of the driver section (e.g., adjusting the spring stiffness or spring constant of the driver section). In some embodiments, application of motor force can be implemented using techniques as described in commonly assigned U.S. Pat. No. 8,624,542, issued on Jan. 7, 2014, which hereby incorporated by reference herein in its entirety.

The force values effected on the one or more piston assemblies are based on the position-force trajectory, which may contribute to the determination of phase information at step 1302. It will be understood that reference to a force being "effected" on a piston assembly refers to a control system causing the mechanism that imparts a force onto the piston assembly to impart the force as indicated by the control system (including a positive force, a negative force, or a force of zero). In some embodiments, the control system may calculate a position-force trajectory for the one or more piston assemblies based at least in part on a desired generator performance (e.g., a desired apex position) and the current position of the one or more piston assemblies. The calculation of a position-force trajectory by the control system may be computed without regard to a deviation from a previously determined trajectory (position-force, time-position, or any other suitable trajectory). For example, instead of using a trajectory that was calculated at the beginning of a stroke (i.e., a previously calculated trajectory) and then compensating for deviations from this previously calculated trajectory during the course of propagation, an entirely new trajectory is calculated every time steps 1304, 1310, and/or 1312 are repeated. This type of resolution allows for changes in and to the operating state of the free-piston generator to be accounted for with each new position-force trajectory calculation. The control system may calculate a position-force trajectory based also on a current or past operating state of the generator. For example, the control system may calculate a position-force trajectory based on any suitable properties of the one or more piston assemblies (e.g., velocities, accelerations, dimensions, mechanical properties), any suitable properties of the reaction section gas (e.g., pressure, temperature, density, specific heat, dimensions), any suitable properties of the driver section (e.g., gas properties if a gas spring, mechanical properties if a mechanical spring, dimensions), any suitable properties of the LEM (e.g., motor force constants, motor force limits, motor current limits, motor resistance), any suitable properties of the generator performance (e.g., efficiency, power output, air flow, fuel flow, exhaust flow, fuel composition, exhaust composition, temperatures, pressures), any other suitable calculated, measured, or estimated values or indicators of the operating characteristics, performance, parameters, and environment of the generator, or any combination thereof.

For ease of reference, the accompanying figures may show multiple components labeled with identical reference numerals. It will be understood that this does not necessarily indicate that the multiple components identically labeled are identical to one another. For example, the pistons labeled 114 and 124 may have different sizes, geometries, materials, any other suitable characteristic, or any combination thereof.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston generators and compressors. In some embodiments, the present disclosure is applicable to combustion and reaction devices such as a reciprocating engine and a free-piston generator. In some embodiments, the present disclosure is applicable to non-combustion and non-reaction devices such as reciprocating compressors and free-piston compressors. In some embodiments, the present disclosure is applicable to linear reciprocating devices with driver sections (e.g., gas springs). In some embodiments, the present disclosure is applicable to oil-free reciprocating and free-piston generators and compressors. In some embodiments, the present disclosure is applicable to oil-free free-piston generators with internal or external reactions. In some embodiments, the present disclosure is applicable to oil-free free-piston generators that operate with compression ignition (e.g., homogeneous charge compression ignition (HCCI), stratified charge compression ignition (SCCI), or other compression ignition), spark ignition, or both. In some embodiments, the present disclosure is applicable to oil-free free-piston generators that operate with gaseous fuels, liquid fuels, or both. In some embodiments, the present disclosure is applicable to linear free-piston generators. In some embodiments, the present disclosure is applicable to engines that operate with a internal combustion or reaction or any type of heat engine with external heat addition (e.g., from a heat source or external reaction such as combustion).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims. The order of steps and components described herein is for illustrative purposes only and is not intended to limit the scope of the disclosure, as various alternative combinations or permutations of the sequence of steps are contemplated.

What is claimed is:

1. A method for controlling a plurality of piston assemblies in a generator, the method comprising:
    determining, using processing circuitry, a respective phase for each of the plurality of piston assemblies relative to at least one other of the plurality of piston assemblies; and
    causing to be modified, using the processing circuitry, at least one operating parameter of the generator based on at least one of the respective phases and on at least one desired phase associated with at least one of the plurality of piston assemblies.

2. The method of claim 1, further comprising a plurality of cores that comprise the plurality of piston assemblies.

3. The method of claim 2, wherein causing to be modified the at least one operating parameter of the generator comprises causing to be modified that least one operating parameter of the generator to synchronize operation of the plurality of cores.

4. The method of claim 3, wherein the at least one operating parameter comprises a respective apex time of at least one of the piston assemblies of the plurality of cores.

5. The method of claim 3, wherein the operation of the plurality of cores comprises at least one of a respective frequency of the plurality of cores or a respective phasing of the plurality of cores.

6. The method of claim 2, wherein each core of the plurality of cores comprises a respective linear electromagnetic machine (LEM).

7. The method of claim 6, wherein each respective LEM of the plurality of cores comprises:
    at least one respective translator comprising at least one respective piston assembly of the plurality of respective piston assemblies; and
    at least one respective stator that produces a respective electromotive force that acts on the at least one respective translator when the at least one respective translator is in motion.

8. The method of claim 6, wherein the respective LEM of at least one of the plurality of cores generates a net electrical energy output over each stroke of the LEM.

9. The method of claim 1, wherein the at least one operating parameter comprises at least one of a net electrical energy output of the generator, a position of at least one piston assembly of the plurality of piston assemblies, a rate of flow of air, a rate of flow of fuel, an intake pressure, or an exhaust pressure.

10. The method of claim 9, wherein the position of the at least one piston assembly of the plurality of piston assemblies comprises a respective apex position of the at least one of the piston assemblies of the plurality of cores.

11. A generator, comprising:
    a plurality of piston assemblies; and
    processing circuitry configured to:
        determine a respective phase for each of the plurality of piston assemblies relative to at least one other of the plurality of piston assemblies; and
        cause to be modified at least one operating parameter of the generator based on at least one of the respective phases and on at least one desired phase associated with at least one of the plurality of piston assemblies.

12. The generator of claim 11, further comprising a plurality of cores that comprise the plurality of piston assemblies.

13. The generator of claim 12, wherein the processing circuitry is further configured to cause to be modified the at least one operating parameter of the generator to synchronize operation of the plurality of cores.

14. The generator of claim 13, wherein the at least one operating parameter comprises a respective apex time of at least one of the piston assemblies of the plurality of cores.

15. The generator of claim 14, wherein the operation of the plurality of cores comprises at least one of a respective frequency of the plurality of cores or a respective phasing of the plurality of cores.

16. The generator of claim 12, wherein each core of the plurality of cores comprises a respective linear electromagnetic machine (LEM).

17. The generator of claim 16, wherein each respective LEM of the plurality of cores comprises:
    at least one respective translator comprising at least one respective piston assembly of the plurality of respective piston assemblies; and
    at least one respective stator that produces a respective electromotive force that acts on the at least one respective translator when the at least one respective translator is in motion.

18. The generator of claim 16, wherein at least one LEM of the plurality of cores generates a net electrical energy output over each stroke of the LEM.

19. The generator of claim 11, wherein the at least one operating parameter comprises at least one of a net electrical energy output of the generator, a position of at least one piston assembly of the plurality of piston assemblies, a rate of flow of air, a rate of flow of fuel, an intake pressure, or an exhaust pressure.

20. The generator of claim 19, wherein the position of the at least one piston assembly of the plurality of piston assemblies comprises a respective apex position of the at least one of the piston assemblies of the plurality of cores.

* * * * *